United States Patent

Sloane et al.

[15] 3,638,004

[45] Jan. 25, 1972

[54] FOURIER TRANSFORM COMPUTER

[72] Inventors: Edwin A. Sloane, Los Altos; Bruce T. McKeever, Sunnyvale; Burtis W. Meyer, Saratoga, all of Calif.

[73] Assignee: Time/Data Corporation, Palo Alto, Calif.

[22] Filed: Oct. 28, 1968

[21] Appl. No.: 771,031

[52] U.S. Cl. ..........235/156, 235/152, 235/168, 235/197

[51] Int. Cl. ..........G06f 15/34, G06f 7/38

[58] Field of Search..........235/152, 156, 168, 186, 197

[56] References Cited

UNITED STATES PATENTS

| | | | |
|---|---|---|---|
| 3,517,173 | 6/1970 | Gilmartin et al. | 235/156 |
| 3,529,142 | 9/1970 | Robertson | 235/197 |
| 2,892,590 | 6/1959 | Esher | 235/186 |
| 3,098,929 | 7/1963 | Kirchner | 235/186 X |
| 3,267,270 | 8/1966 | Smidowicz | 235/186 |
| 3,475,626 | 10/1969 | Holzman et al. | 235/186 X |
| 3,501,758 | 3/1970 | James et al. | 235/186 X |
| 3,544,775 | 12/1970 | Bergland | 235/156 UX |
| 3,573,446 | 4/1971 | Bergland | 235/156 |
| 3,591,784 | 7/1971 | Cutter | 235/152 |
| 3,588,460 | 8/1971 | Smith | 235/156 |
| 3,584,782 | 6/1971 | Bergland | 235/156 |
| 3,584,781 | 6/1971 | Edson | 235/156 |

*Primary Examiner*—Malcolm A. Morrison
*Assistant Examiner*—James F. Gottman
*Attorney*—Spensley, Horn and Lubitz

[57] ABSTRACT

A digital computer for rapidly determining the Fourier transform of a real input signal is disclosed. The computer utilizes the symmetries of sinusoidal functions to reduce the computations required to determine the Fourier transform. Simultaneous addition, multiplication and memory accessing are performed by the computer thereby reducing the time normally required to compute a Fourier transform.

13 Claims, 9 Drawing Figures

EDWIN A. SLOANE
BRUCE T. McKEEVER
BURTIS W. MEYER
INVENTORS

BY

ATTORNEYS

EDWIN A. SLOANE
BRUCE T. McKEEVER
BURTIS W. MEYER
INVENTORS

BY Spensley & Horn
ATTORNEYS

EDWIN A. SLOANE
BRUCE T. McKEEVER
BURTIS W. MEYER
INVENTORS

BY Spensley & Horn
ATTORNEYS

INVENTORS
EDWIN A. SLOANE
BRUCE T. McKEEVER
BURTIS W. MEYER
BY
Spensley & Horn
ATTORNEYS EDWIN A. SLOANE
BRUCE T. McKEEVER
BURTIS W. MEYER
INVENTORS BY Spensley & Horn
ATTORNEYS

EDWIN A SLOANE
BRUCE T. MCKEEVER
BURTIS W. MEYER
INVENTOR.

BY Spensley & Horn
ATTORNEYS

FOURIER TRANSFORM COMPUTER

BACKGROUND OF THE INVENTION

1. Field of the Invention

This invention relates to the field of computers and in particular, a digital computer for determining the Fourier transform of an input signal.

2. Description of the Prior Art

The Fourier transform has been well known to mathematicians since formulation in the early 1800's. It is expressed mathematically as follows:

$$G(jw)=\int_{-\infty}^{+\infty} g(t)\,e^{-jwt}dt$$

and the inverse as:

$$g(t)=\frac{1}{2\pi}\int_{-\infty}^{+\infty} G(jw)\,e^{jwt}dw$$

where $g(t)$ is a time varying function, or input signal, to the computer and $G(jw)$ is the Fourier transform (a frequency domain representation of $g(t)$).

For some time the Fourier transform has been used for the analysis of sound and vibrations problems. More recently, the transform has become a tool for scientists in the field of medicine, economics and defense systems.

In biomedicine, there have been attempts at the Massachusetts Institute of Technology as early as 1950 to adopt the tools of correlation and spectral-density analysis to the interpretations of the electroencephalogram. The Fourier transform is an efficient method for preforming correlation and spectral-density analysis of an input signal. This analysis of input signals has not only been attempted with brain waves but also with electrocardiograph signals where reasonable success has taken place in the automatic machine diagnosis of cardiac pathology. These methods have also provided a better basis for the understanding of biological systems through their application to model synthesis.

Analysis of echoes from subterranean structures, such as are produced in the seismic technology, has in recent years, been furthered through the use of Fourier transforms on such data. In oceanography, the Fourier transform has been important in the analysis of various time series such as water temperature, salinity, tides, ocean currents, etc.

The post World War II era has also seen the tools of Fourier transform of time series stimulate new research in the fields of economics. Significant contributions to the literature has been made by R. G. Brown and Arthur D. Little in the field of inventory and production control, and by C. Granger of the Economics Research Program at Princeton University in the application of spectral-analysis to economic time series.

In the prior art, the computation of the Fourier transform for a given data sample has required an elaborate computer means if the results are to be meaningful and quickly obtainable. Large scale general purpose digital computers have been employed for computing the Fourier transform. These systems are exceedingly expensive, not available in many instances, require programming, and related paper work, do not communicate directly with the scientist or economist user and are generally inefficient in performing the Fourier transform. Recently, time sharing has made the digital computer more accessible but the availability of terminal equipment for two-way communication and especially communication of visual information presents considerable problems and expense. In addition, the availability of telephone lines and the simultaneous use of a central computer by many users makes real time computation exceedingly difficult to realize and presents serious problems of priority and program storage and selections.

With respect to the more efficient usage of the digital computer, a number of programs and related techniques for large scale digital computers have been developed. For example, the publication by J. W. Cooley and J. W. Tukey, "An Algorithm for the Machine Calculation of Complex Fourier Series," Math of Computation, Vol. 19, pp. 297–301, Apr. 1965, explains such techniques. Another technique for computing the Fourier transform can be found in an article by G. C. Danielson and Cornelius Lanczos, Franklin Institute Journal, Vol. 233, Apr. 1942.

Other prior art computer systems have employed analysis techniques for computing the Fourier transform. These systems are inherently slow, inaccurate and while lower priced than large digital systems, are relatively expensive.

SUMMARY OF THE INVENTION

The disclosed computer permits simplification of prior Fourier transform methods by a construction of computational means which takes advantage of inherent time and frequency symmetry of sinusoidal functions.

Briefly, in the disclosed computer by recognition of the inherent symmetries of sinusoidal functions, a real input signal is repeatedly folded. This folding process reduces the number of cumulative multiplies normally associated with the computation of the Fourier transform. A considerable savings in hardware and processing time is achieved by folding the input signal.

The purpose of this invention is to provide a computer for determining the Fourier transform of an input signal in a minimum of processing time utilizing conventional hardware. The invented computer is not a general purpose digital computer, but rather is constructed principally for determining time-frequency transformations of real input signals. The operation of the computer does not require sophisticated mathematical skills. It is intended to be useful to those having little mathematical background but yet requiring the mathematical results of such transformations, such as medical personnel, social scientists, military technicians, strategists and economists. In many fields, the interpretation of the Fourier transform does not require any understanding of the mathematics, but rather approaches an intuitive association of the transform data with the input signal. Since the computation by the invented computer is accomplished rapidly, it is possible to have simultaneous displays of both input and transformed data. This allows an immediate association which will be particularly valuable in corrective systems and applications which dictate immediate action. This type of tool will result in expanded new use for the Fourier transform.

DETAILED DESCRIPTION OF THE INVENTION

Because of the complexity of the computer, the following table of contents is presented to assist in identifying portions of the description. Two embodiments of the computer are disclosed, the first shall be referred to as Computer I, the second as Computer II.

TABLE OF CONTENTS

| Section | Title | Col. |
|---|---|---|
| 1. | General description of the computer | 3 |
| 2. | Mathematical explanation | 4 |
| | (a) Computer I | 4 |
| | (b) Computer II | 7 |
| 3. | Computer I | 12 |
| | (a) Description | 12 |
| | (b) Operation | 14 |
| | (c) Analog to digital converter | 18 |
| | (d) Trigonometric means | 19 |
| 4. | Computer II | 22 |
| | (a) Description | 22 |
| | (b) Operation | 23 |

1. General Description of the Computer

The Fourier computer is a two-channel system which accepts either analog or digital inputs, performs a selected algorithm or transfer, and provides two channels of analog or digital output, and a visual display. The operator's console provides simple, pushbutton or selector control of all input, algorithm, transfer and display functions. The computer is prewired so that no programming is required. While the computer is capable of performing several operations other than the Fourier transform, the detailed description set forth in this specification is limited to the Fourier transform performed on one channel of the computer.

Figure 1:
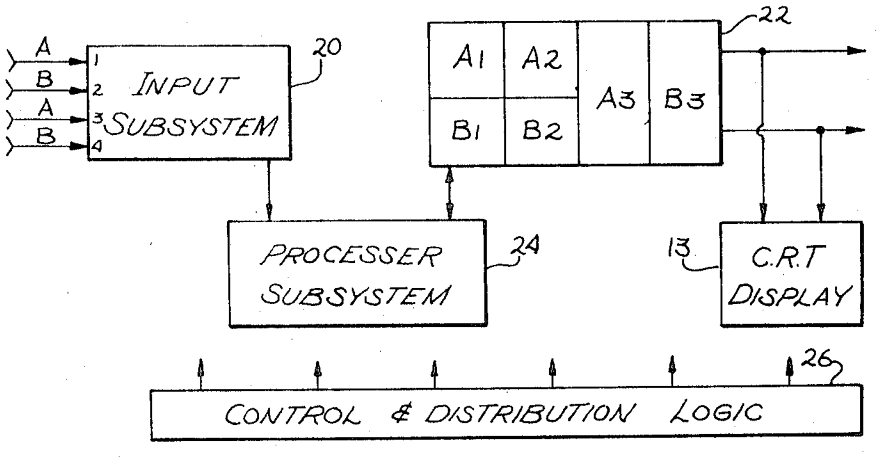
FIG. 1 is a functional block diagram of the Fourier transform computer.

FIG. 1 illustrates a simplified system block diagram of the computer. The input signal, if in analog form, is received at analog input terminals 1 and 2; if in digital form, the input signal is received at digital input terminals 3 and 4. The selection of either analog or digital input signals is made by the operator.

The analog inputs supplied to terminals 1 and 2 are coupled to a analog-digital converter within means 20 which simultaneously sample (e.g., with less than 1 microsecond aperture time) and converts the input signal into a digital form (e.g., with 8-bit resolution at a rate up to 10,000 samples/sec.). The converted input signal is loaded into input memory sections A1 and B1 of memory means 22. The terminals 1 and 2 are preferably electrically floating with respect to computer ground, thereby allowing the use of external buffer amplifiers. Sampling period and sensitivity may be controlled by the operation from the computer front panel.

The digital input signals to terminals 3 and 4 are coupled to memory means 22 via input means 20. Terminals 3 and 4 are provided to receive 8-bit words. These words are treated in the same manner as the output words of the analog to digital converter.

The memory means 22 typically consists of coincident-current memory cores and has a capacity of 4,096 18-bit words. Means 22 may be organized into six 1,024-word sections; sections A1 and B1 for input signal storage, sections A2 and B2 for inprocess storage and sections A3 and B3 for output storage. Any input or output stored data may be accessed for display or for the transfer of its data to another section. Input signals are converted to 1,001 8-bit words for storage in A1 and B1.

Control means 26 consists of the controls and instruction logic. This means receives and temporarily stores instructions entered by the operator, provides interlocks to prevent entry of conflicting instructions and controls processor 24.

Processor 24 accesses data from A1, A2, B1 and B2, performs the appropriate mathematical operation (e.g., multiplication, accumulation, etc.) and stores the results in output memory A3 and B3 or A2 and B2.

Included within means 24 is a function generator which provides digital signals for sine and cosine values utilized in the computation of the Fourier transform. Values are produced for discrete angular increments, said increments corresponding to the sample period employed in connection with the input signal. Harmonics of a basic frequency whose period is equal to the length of the input frame or signal are utilized in the computation of the Fourier transform.

A cathode-ray tube display 13 receives signals from memory 22 and permits a display of input or output signals stored in memory 22. Display means 13 contains a digital to analog converter, allowing the display of the memory contents in analog form.

It should be understood that the block diagram of FIG. 1 is simplified for the purposes of a general explanation; certain of the functional units overlap, interact and perform additional detail functions.

2. Mathematical Explanation a. Computer I

Computer I utilizes the half-wave and quarter-wave symmetry of sinusoidal functions (both sine and cosine functions) to reduce the computations normally required to obtain the Fourier transform. In addition, the fundamental sinusoidal frequency utilized in the computation is chosen so that its period is equal to the period of the input signal. This creates a frequency symmetry that, through the use of "toggling," allows a further reduction in the number of computations required to obtain the Fourier transform.

Figure 3:
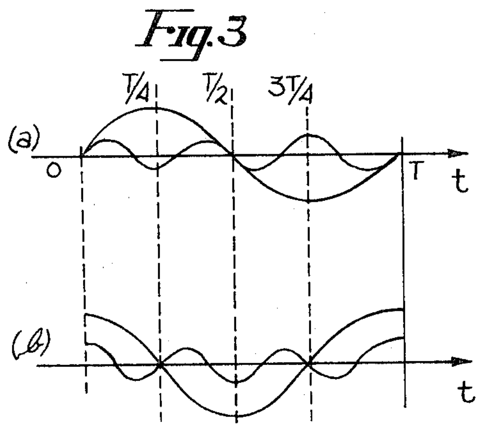
FIG. 3*a* illustrates the quarter and half-wave symmetry of a sine function.
FIG. 3*b* illustrates the quarter and half-wave symmetry of a cosine function.

FIG. 3 illustrates the half-wave and quarter-wave symmetry of sinusoidal functions. In FIG. 3*a* the fundamental and third harmonic of a sine wave are shown on the same time axis. The period of the fundamental frequency is T. It can be seen that the sine waves are symmetrical about the points T/2, T/4 and 3T/4. It is this symmetry that allows the input signal (for which the Fourier transform is to be computed) to be "folded" about the half-wave and quarter-wave points of the sine wave. While only the fundamental and third harmonic are illustrated, the half-wave and quarter-wave symmetry exists for every harmonic of the fundamental frequency.

In FIG. 3*b* the fundamental and third harmonic of a cosine function are illustrated. The half-wave and quarter-wave symmetry previously discussed for the sine function applies also to the cosine function. Therefore, sinusoidal functions have an inherent time symmetry about their half-wave and quarter-wave points.

The computer performs numerically the operation implied mathematically by the complex Fourier transform:

$$G(jf)=\int_{-\infty}^{+\infty} g(t)e^{-2j\pi ft}dt$$
$$=\int_{-\infty}^{+\infty} g(t)\,(\cos 2\pi f - j\sin 2\pi f)\,dt$$

where $g(t)$ is the time-domain input function and $G(jf)$ is the complex frequency-domain output. This function may be expressed and calculated as $$G(jf)=P(f)+jQ(f)$$

where $P(f)$ represents the inphase (real, or cosine) amplitude component at any frequency $f$, and $Q(f)$ is the quadrature (imaginary, or sine) component at that frequency. Since the time-domain input ($g(t)$) is sampled and quantized only a finite number of samples are available, the finite transform is used, i.e.:

$$P_T(f)=\int_{-T/2}^{+T/2} g(t)\cos 2\pi ft\,dt$$

and $$Q_T(f)=-\int_{-T/2}^{+T/2} g(t)\sin 2\pi ft\,dt$$

where $T$ is the length of the input signal or frame, which is assumed to be centered about time $t=0$.

It is implicit in the use of the limited time function ($-T/2$ to $+T/2$) that the time function is periodic and hence the transform output is defined only for discrete values of frequency. If the period is assumed for be $2T$, these are all integral multiples, $k$, of a base frequency $f_0$, where $f_0$ is equal to $1/2T$. This base frequency, $f_0=1/2T$, is the half frequency of the true fundamental which would have a period $T$, equal to the length of the input signal or frame. Thus, ordinarily the computation provides twice as many Fourier coefficients as are necessary for a frequency domain description. This inclusion of half-frequency information allows subsequent operations on the output data which are not the subject of this invention.

For convenience in referring to odd and even harmonics in relation to odd and even memory addresses, the base frequency $f_0=1/2T$, is referred to hereafter as the first (odd) harmonic (i.e., fundamental). The true fundamental of the input frame with period $T$ is referred to as the second (even) harmonic, and so on. The maximum harmonic to which a coefficient may be obtained in $Kf_0=2Nf_0$, where $2N+1$ equals the number of samples in the frame.

Replacing the continuous input, $g(t)$, by a set of $2N+1$ discrete samples at intervals of $t_0+1/2N$, and replacing the sinusoidal functions by corresponding discrete values, of each harmonic taken at the same intervals, the continuous integrals may be expressed as the sum of the products:

$$P(kf_0)=\sum_{n=-N}^{tN} g(nt_0)\ \cos 2\pi kf_0(nt_0)$$

$$Q(kf_0)=-\left[\sum_{n=-N}^{tN} g(nt_0)\ \sin 2\pi kf_0(nt_0)\right]$$

or, in terms of the channel A (e.g., terminals 1 and 3, etc.) where the sample amplitudes of the input signal or frame are $A_{-N} \ldots A_{+N}$.

$$P(kf_0)=C_{-N}A_{-N}+C_{1-N}A_{1-N}+\ \ldots\ C_{-n}A_{-n}\ \ldots\ +C_{-1}A_{-1}+C_0 A_0+C_{+1}A_{+1}\ldots C_{+n}A_{+n}\ldots+C_NA_N$$

$$Q(kf_0)=-[D_{-N}A_{-N}+D_{1-N}A_{1-N}+\ \ldots\ D_{-n}A_{-n}+D_{-1}A_{-1}+D_0 A_0+DA_1+\ldots D_{+n}A_{+n}\ldots+D_NA_N]$$

where $C_0$ to $C_{\pm N}$ are the cosine values at corresponding discrete intervals, and $D_0$ to $D_{\pm N}$ are the sine values. Identical expressions apply to channel B with the substitution of $B_n$ amplitudes for $A_n$.

Symmetries are present in the above sinusoidal functions which allow a great reduction in the number of memory accesses, multiplies, and accumulations required for each output. These symmetries allow "folding" of each frame (e.g., input signal) about its center point, and "folding" of the harmonic frequencies about the center frequency, $K/2 f_0$.

Firstly, the cosines have even symmetry about $t=0$, and the sines have odd symmetry about $t=0$. (This corresponds to the symmetry shown in FIG. 3 about $T/2$.) Thus, $$C_{-n}=C_{+n} \text{ and } D_{-n}=-D_{+n}$$

Substituting these values into the equations for $P(kf_0)$ and $Q(kf_0$ yields:

$$P(kf_0)=C_0A_0+C_1(A_{+1}+A_{-1})+\ldots \ldots+C_n(A_{+n}+A_{-n})+\ldots C_N(A_{+N}+A_{-N}) \quad (1)$$

$$Q(kf_0)=-[D_0A_0+D_1(A_{+1}-A_{-1})+\ldots \ldots+D_n(A_{+n}-A_{-n})+\ldots+D_N(A_{+N}-A_{-N})] \quad (2)$$

This first symmetry is implemented with one operation for all harmonic frequencies by initially "folding" the data input frame about its center point, $A_0$. The fold produces expressions for the sums (Σ's) and differences (Δ's) of data samples symmetrically disposed about the center point, $A_0$. The following expressions are representations of the fold:

| | |
|---|---|
| $\Sigma_0=A_0$ | $\Delta_0=A_0$ |
| $\Sigma_1=A_{+1}+A_{-1}$ | $\Delta_1=A_1-A_{-1}$ |
| $\Sigma_n=A_{+n}+A_{-n}$ | $\Delta_n=A_{+n}-A_{-n}$ |
| $\Sigma_N=A_{+N}+A_{-N}$ | $\Delta_N=A_{+N}-A_{-N}$ |

With this data fold, it is only necessary to perform multiplications for the sinusoidal values at either positive or negative times, since each product $C_n \cdot \Sigma_n$ accounts for two input data points.

Figure 2:
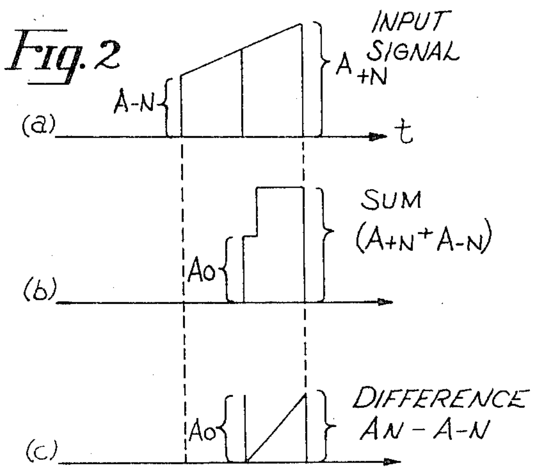
FIG. 2*a* illustrates an input signal.
FIG. 2*b* illustrates the first paired sums of the input signal.
FIG. 2*c* illustrates the first paired differences of the input signal.

FIG. 2 illustrates this fold, graphically. In FIG. 2*a* the input signal or frame is shown with amplitudes $A_{-N}$, $A_0$ and $A_{+N}$. The $\Sigma_n$ quantities are illustrated in FIG. 2*b* with the amplitudes $A_0$ ($\Sigma_0$) and ($A_{+N}+A_{-N}$) shown. FIG. 2*c* illustrates the $\Delta_n$ quantities with the amplitude $A_0$ ($\Delta_0$) and ($A_{+N}-A_{-N}$) shown.

In addition to this "time" fold about $t=0$, a frequency symmetry exists between high and low harmonics. When the number of harmonics used is equal to the number of sample intervals ($K=2N$), it can be shown that the sinusoidal value at a given sample point has equal magnitude for frequencies symmetrically disposed about the center frequency $K/2 \cdot f_0$; i.e., $|C_n|$ is equal for $kf_0$ and $(K-k)f_0$. However, the algebraic sign of $C_n$ for the high frequency is alternately the same as and opposite to the low-frequency sign at successive sample points. For cosine functions, the algebraic sign is the same at even-subscript samples ($C_0$, $C_2$, $C_4$, etc.), and opposite for odd samples ($C_1$, $C_3$, $C_5$, etc.), as shown by:

$$C_{2n}(Kf_0-kf_0)=C_{2n}(kf_0)$$
$$C_{2n+1}(Kf_0-kf_0)=-C_{2n+1}(kf_0)$$

The opposite convention applies for the sine function where the high-frequency algebraic sign is opposite at even points and the same at odd points, i.e.:

$$D_{2n}(Kf_0-kf_0)=-D_{2n}(kf_0)$$
$$D_{2n+1}(Kf_0-kf_0)=D_{2n+1}(kf_0)$$

The recognition of this frequency symmetry enables more efficient processing and hence increased speeds of operation. Applying this frequency symmetry, the magnitudes of the products $C_n \cdot \Sigma_n$ and $D_n \cdot \Delta_n$ can be used in concurrent accumulations for coefficients of two frequencies, symmetrical about the center frequency. For the high frequencies ($kf_0>(k/2) \cdot f_0$), the signs of the products are alternated by toggling in accordance with the above convention, producing:

$$P(Kf_0-kf_0)=C_0 \cdot A_0-C_1(A_1+A_{-1})+C_2(A_2+A_{-2})-C_3(A_3+A_{-3})+\ldots \text{etc.}, \quad (3)$$

$$Q(Kf_0=kf_0)=-[-D_0 \cdot A_0+D_1(A_1-A_{-1})\quad -D_2(A_2-A_{-2})+D_3(A_3-A_{-3})-\ldots \text{etc.}] \quad (4)$$

All odd-harmonic coefficients are computed using equations (1), (2), (3) and (4). For even harmonics, additional symmetries exist in the sinusoidal functions, allowing further condensation. Note that sine $f_0$ was taken as $1/2T$ the quarter-wave symmetry shown in FIG. 3 (about T/4 and 3l/4) does not exist for the odd harmonics. If $f_0$ had been made equal to 1/T, the quarter-wave symmetry would exist for all harmonics. The present method of letting $f_0=1/2T$ provides half-frequency information useful for some application of the Fourier transform.

For the even harmonics, $0f_0$ (the DC component), $2f_0$, $4f_0$, etc., a second "time" symmetry exists about the "quarter" points $C_{N/2}$ and $D_{N/2}$. The sinusoidal values at sample points equally disposed about $N/2$ have equal magnitude. The sign convention depends on whether the harmonic is in the series $4kf_0$, or the interleaving series $2f_0+4kf_0$.

For the first of these series, $4kf_0$, the cosine has even symmetry about $N/2$ and the sine has odd symmetry, giving:

$$C_{N-n}(4kf_0)=C_n(4kf_0)$$
$$D_{N-n}(4kf_0)=-D_n(4kf_0)$$

When these expressions are substituted into equations (3) and (4) the required accumulations are reduced to:

$$P(4kf_0)=C_0[A_0+(A_N+A_{-N})]+C_1[(A_1+A_{-1})+(A_{N-1}+A_{1-N})]+\ldots+C_n[(A_n+A_{-n})+(A_{N-n}+A_{n-N})]+\ldots\ldots+C_{N/2}(A_{N/2}+A_{-N/2}) \quad (5)$$

and $$Q(4kf_0)=-\{D_0[A_0-(A_N-A_{-N})]+D_1[(A_1-A_{-1})-(A_{N-1}-A_{1-N})]+\ldots+D_n[(A_n-A_{-n})-(A_{N-n}-A_{n-N})]+\ldots\ldots+D_{N/2}(A_{N/2}-A_{-N/2})\} \quad (6)$$

The expressions for the data amplitudes are seen to be the sums about $N/2$ of the first-fold sums, and the differences of the first-fold differences, i.e.:

$$\Sigma\Sigma_n=(A_{+n}+A_{-n})+(A_{N-n}+A_{n-N})$$
$$\Delta\Delta_n=(A_{+n}-A_{-n})-(A_{N-n}-A_{n-N})$$

The quantities $\Sigma\Sigma_n$ and $\Delta\Delta_n$ are formed by a second "fold" of the data point sums and differences about the point $N/2$.

A high- versus low-frequency symmetry also exists for even harmonics, where the sign of the high-frequency sinusoidal value alternates with respect to the low-frequency sign. Thus the products $C_n \cdot \Sigma\Sigma_n$ and $D_n \cdot \Delta\Delta_n$ can be used concurrently to produce a low- and a high-frequency coefficient. For cosine functions, the algebraic sign for low and high frequencies is the same at even sample points ($C_0$, $C_2$, $C_4$) and opposite at odd points ($C_1$, $C_3$, $C_5$). The opposite convention applies to the sine function, so the expressions for the high-frequency coefficients in series $4kf_0$ are modified to:

$$P(Kf_0-4kf_0)=C_0\Sigma\Sigma_0-C_1\Sigma\Sigma_1+C_2\Sigma\Sigma_2-\ldots \quad (7)$$

$$Q(Kf_0-4kf_0)=-[-D_0\Delta\Delta_0+D_1\Delta\Delta_1-D_2\Delta\Delta_2+\ldots] \quad (8)$$

The interleaving harmonic series $2f_0+4kf_0$ has a "time" symmetry about $N/2$ that is opposite in sign convention to the series $4kf_0$, i.e.:

$$C_{N-n}(2f_0+4kf_0)=-C_n(2f_0+4kf_0)$$
$$D_{N-n}(2f_0+4kf_0)=D_n(2f_0+4kf_0)$$

Applying these symmetries to the original expressions, it can be shown that the cosine (real) transform coefficients for this series are formed using the differences of the first-fold sums ($\Delta\Sigma$), and the sine transform coefficients use the sums of the first-fold differences ($\Sigma\Delta$), where:

$$\Delta\Sigma_n=(A_{+n}+A_{-n})-(A_{N-n}+A_{n-N})$$
$$\Sigma\Delta_n=(A_{+n}-A_{-n})+(A_{N-n}+A_{n-N})$$

The same high versus low-frequency symmetry exists as for the other series, so that two coefficients are formed from one set of products by toggling the applied sign for the high frequency. The coefficients for this series are:

$$P(2f_0+4kf_0)=C_0\Delta\Sigma_0+C_1\Delta\Sigma_1+C_2\Delta\Sigma_2+C_3\Delta\Sigma_3+\ldots \quad (9)$$

$$P(Kf_0-2f_0-4kf_0)=C_0\Delta\Sigma_0-C_1\Sigma\Delta_1+C_2\Delta\Sigma_2-\ldots \quad (10)$$

$$Q(2f_0+4kf_0)=-[D_0\Sigma\Delta_0+D_1\Sigma\Delta_1+D_2\Sigma\Delta_2+\ldots] \quad (11)$$

$$Q(Kf_0-2f_0-4kf_0)=-[-D_0\cdot\Sigma\Delta_0+D_1\Sigma\Delta_1-D_2\Sigma\Delta D_2+\ldots] \quad (12)$$

b. Computer II

As demonstrated in the previous section, the number of multiplication and accumulation operations required to obtain the Fourier transform can be reduced by folding the input signal. This folding permits a more rapid computation of the transform. In addition, if the period of the fundamental frequency is equal to the period of the input signal or frame two complete folds are possible corresponding to the quarter-wave and half-wave symmetry of sinusoidal functions. It should be noted that after each fold the number of groups of terms or words contained before the fold are converted to twice as many groups, each containing one-half as many words. For example, in the preceding section $A_{-N} \ldots A_{+N}$ was folded to form two groups ($\Sigma_n$ and $\Delta_n$) and each group contains half as many words or terms as the preceding group ($\Sigma_n=A_{+n}+A_{-n}$ and $\Delta_n=A_{+n}-A_{-n}$). If $f_0$ had been made equal to $1/T$ then a second fold would have been possible, resulting in four groups of terms with each group containing half as many terms as the groups $\Sigma_n$ and $\Delta_n$. In Computer II the input signal or frame is repeatedly folded until each group of words or terms contains no more than three words. As will be seen, the Fourier transform of these groups of three words can be readily determined without the multiplication and accumulation step required in Computer I.

Computer II first folds the input signal in the same manner as described above to form the groups of words $\Sigma_n$ and $\Delta_n$. The remaining folds are complex folds, which utilize complex multiplication where the lack of sinusoidal symmetry would not otherwise permit folding.

For Computer II, $f_0$ is equal to $1/T$, where $T$ is the period of the input signal or frame and $f_0$ is the fundamental frequency used in the computation. The following symbols are used for this discussion:

1. $g(t)$, the input signal or frame;
2. $N$, the maximum number of samples of the input signal;
3. $X_{p,q}$, where $X$ is a group of words of folded data which can be shown to contain only cosine functions, $p$ is the number or stage of the complex fold and $q$ is an index to indicate a subgrouping within each group;
4. $Y_{p,q}$, where $Y$ is a group of words of folded data which can be shown to contain only sine functions and where $p$, and $q$ are the same as defined in 3;
5. $a_k$ is the $k^{th}$ real coefficient of a Fourier expansion;
6. $b_k$ is the $k^{th}$ imaginary coefficient of a Fourier expansion;
7. $t_0$ is the sampling period of the input signal. Assuming the input signal $g(t)$ is periodic, with a period $T$:

$$g(t)=\sum_{k=0}^{N/2} a_k \cos k\omega_0 t+\sum_{k=0}^{N/2} b_k \sin k\omega_0 t$$

where $\omega_0=2\pi f_0=(2\pi/T)$, $T \geq t \geq 0$, $T=Nt_0$, and $t=nt_0$ where $n=0,1,2 \ldots N$.

First Fold

The first fold performed by Computer II corresponding to the formation of the $\Sigma_n$ and $\Delta_n$ as was accomplished in Computer I. This first fold may be expressed mathematically as:

$$\Sigma_n=X_{0,0}(t)=g(t)+g(T-t) \quad (21)$$
$$\Delta_n=Y_{0,0}(t)=g(t)-g(T-t) \quad (22)$$

It can be shown, by reliance on the sinusoidal symmetry, that, $g(t)\alpha X_{0,0}(t)+Y_{0,0}(t)$ as follows:

$$X_{0,0}(t)=g(t)+g(T-t)=\sum_{k=0}^{N/2} a_k \cos k\omega_0 t+\sum_{k=0}^{N/2} b_k \sin k\omega_0 t+\sum_{k=0}^{N/2} a_k \cos k\omega_0 (T-t)+\sum_{k=0}^{N/2} b_k \sin k\omega_0 (T-t) \quad (23)$$

The following symmetries exist:

$$\cos k\omega_0(T-t)=\cos(K(2\pi/T)T-k\omega_0 t)=\cos(k2\pi-k\omega_0 t)=\cos k\omega_0 t$$

and similarly $$\sin k\omega_0(T-t)=-\sin k\omega_0 t$$

Utilizing these symmetries in equation 13 yields $$X_{0,0}(t)=\sum_0^{N/2} a_k \cos k\omega_0 t+\sum_0^{N/2} b_k \sin k\omega_0 t+\sum_0^{N/2} a_k \cos k\omega_0 t-\sum_0^{N/2} b_k \sin k\omega_0 t$$

∴ thus $$X_{0,0}(t)=2\sum_0^{N/2} a_k \cos k\omega_0 t$$

and by a similar method $$Y_{0,0}(t)=2\sum_0^{N/2} b_k \sin k\omega_0 t$$

Therefore, $g(t)\alpha X_{0,0}(t)+Y_{0,0}(t)$; note also that for $X_{0,0}(t)$ and $Y_{0,0}(t)(T/2) \geq t \geq 0$.

Second Fold (First Complex Fold)

Four new groups of terms can be formed by folding the data resulting from the first fold. These groups may be written as follows:

$$X_{1,0}(t)=X_{0,0}(t)+X_{0,0}(\tfrac{1}{2}T-t) \quad (24)$$
$$Y_{1,0}(t)=Y_{0,0}(t)-Y_{0,0}(\tfrac{1}{2}T-t) \quad (25)$$
$$X_{1,1}(t)=[X_{0,0}(t)-X_{0,0}(\tfrac{1}{2}T-t)]\cos\omega_0 t+[Y_{0,0}(t)+Y_{0,0}(\tfrac{1}{2}T-t)]\sin\omega_0 t \quad (26)$$
$$Y_{1,1}(t)=[Y_{0,0}(t)+Y_{0,0}(\tfrac{1}{2}T-t)]\cos\omega_0 t-[X_{0,0}(t)-X_{0,0}(\tfrac{1}{2}T-t)]\sin\omega_0 t \quad (27)$$

From the following symmetries:

$$\cos k\omega_0(\tfrac{1}{2}T-t)=(-1)^k \cos k\omega_0 t$$

and $$\sin k\omega_0(\tfrac{1}{2}T-t)=-(-1)^k \sin k\omega_0 t$$

it can be shown that $$X_{1,0}(t)=4\sum_{0}^{N/4} a_{2k}\cos 2k\omega_0 t$$

$$Y_{1,0}(t)=4\sum_{0}^{N/4} b_{2k}\sin 2k\omega_0 t$$

$$X_{1,1}(t)=2\sum_{0}^{N/4}[a_{2k+1}+a_{2k-1}+b_{2k+1}-b_{2k-1}]\cos 2k\omega_0 t$$

$$Y_{1,1}(t)=2\sum_{0}^{N/4}[a_{2k+1}-a_{2k-1}+b_{2k+1}+b_{2k-1}]\sin 2k\omega_0 t$$

where $\frac{T}{4}\geq t\geq 0$

Also, $$g(t)\alpha\ X_{1,0}(t)+Y_{1,0}(t)+[X_{1,1}(t)+Y_{1,1}(t)]\cos\omega_0 t+[X_{1,1}(t)-Y_{1,1}(t)]\sin\omega_0 t$$

Therefore, the data contained in the second fold may be utilized to compute the Fourier coefficients, if desired. In addition, the original input signal $g(t)$ is preserved since $g(t)$ may be reconstructed from the folded data.

Third Fold (Second Complex Fold)

Eight new groups may be formed from the results of the previous fold as follows:

$$X_{2,0}(t)=X_{1,0}(t)+X_{1,0}(\tfrac{1}{4}T-t) \quad (28)$$
$$Y_{2,0}(t)=Y_{1,0}(t)-Y_{1,0}(\tfrac{1}{4}T-t) \quad (29)$$
$$X_{2,1}(t)=X_{1,1}(t)+X_{1,1}(\tfrac{1}{4}T-t) \quad (30)$$
$$Y_{2,1}(t)=Y_{1,1}(t)-Y_{1,1}(\tfrac{1}{4}T-t) \quad (31)$$
$$X_{2,2}(t)=[X_{1,0}(t)-X_{1,0}(\tfrac{1}{4}T-t)]\cos 2\omega_0 t+[Y_{1,0}(t)+Y_{1,0}(\tfrac{1}{4}T-t)]\sin 2\omega_0 t \quad (32)$$
$$Y_{2,2}(t)=[Y_{1,0}(t)+Y_{1,0}(\tfrac{1}{4}T-t)]\cos 2\omega_0 t-[X_{1,0}(t)-X_{1,0}(\tfrac{1}{4}T-t)]\sin 2\omega_0 t \quad (33)$$
$$X_{2,3}(t)=[X_{1,1}(t)+X_{1,1}(\tfrac{1}{4}T-t)]\cos 2\omega_0 t+[Y_{1,1}(t)-Y_{1,1}(\tfrac{1}{4}T-t)]\sin 2\omega_0 t \quad (34)$$
$$Y_{2,3}(t)=[Y_{1,1}(t)+Y_{1,1}(\tfrac{1}{4}T-t)]\cos 2\omega_0 t+[X_{1,1}(t)-X_{1,1}(\tfrac{1}{4}T-t)]\sin 2\omega_0 t \quad (35)$$

Once again the $X$ groups can be shown to contain only cosine components and that the $Y$ groups contain only sine components.

In addition, it can be shown that:

$$g(t)\propto X_{2,0}(t)+Y_{2,0}(t)+[X_{2,1}(t)+Y_{2,1}(t)]\cos\omega_0 t+[X_{2,1}(t)\alpha Y_{2,1}(t)]\sin\omega_0 t+[X_{2,2}(t)+Y_{2,2}(t)]\cos 2\omega_0 t+[X_{2,2}(t)Y_{2,2}(t)]\sin 2\omega_0 t+[X_{2,3}(t)+Y_{2,3}(t)]\cos 3\omega_0 t+[X_{2,3}(t)Y_{2,3}(t)]\sin 3\omega_0 t$$

where $(T/8)\geq t\geq 0$

Therefore, the original signal $g(t)$ is preserved within the folded data.

The above-described folding process can be continued until each group of $X_{p,q}(t)$ and $Y_{p,q}(t)$ contain two terms or words. When this occurs, the folding process is completed and the coefficients may be computed. The complex folding process may be written in general terms as follows (to obtain the $p+1$ stage of folding from the $p$ stage):

$$X_{p+1,q}(t)=X_{p,q}(t)+X_{p,q}(\tfrac{1}{2}T2^{-p}-t) \quad (36)$$
$$Y_{p+1,q}(t)=Y_{p,q}(t)-Y_{p,q}(\tfrac{1}{2}T2^{-p}-t) \quad (37)$$
$$X_{p+1,q+2}p(t)=[X_{p+q}(t)-X_{p,q}(\tfrac{1}{2}T2^{-p}-t)]\cos 2^p\omega_0 t+[Y_{p,q}(t)+_{p,q}(\tfrac{1}{2}T2^{-p}-t)]\sin 2^p\omega_0 t \quad (38)$$
$$Y_{p+1,q+2}p(t)=[Y_{p+q}(t)+Y_{p,q}(\tfrac{1}{2}T2^{-p}-t)]\cos 2^p\omega_0 t-[X_{p,q}(t)-_{p,q}(\tfrac{1}{2}T2^{-p}-t)]\sin 2^p\omega_0 t \quad (39)$$

It can be shown that:

$$X_{p,q}(t)=2^p\sum_{0}^{1/2N2^{-p}}[a_{2^pk+q}+a_{2^pk-q}+b_{2^pk+q}-b_{2^pk-q}]\cos 2^pk\omega_0 t \quad (44)$$

and $$Y_{p,q}(t)=2^p\sum_{0}^{1/2N2^{-p}}[a_{2^pk+q}-a_{2^pk-q}+b_{2^pk+q}+b_{2^pk-q}]\sin 2^pk\omega_0 t \quad (45)$$

where $$\tfrac{1}{2}T2^{-p}\geq t\geq 0$$

Thus, at any stage of folding, the Fourier coefficient may be determined from equations (44) and (45).

If the folding is continued until $p$ is equal to $\log_2(N/4)$, then the groups $X_{p,q}(t)$ will contain three words each and the groups $Y_{p,q}(t)$ will contain one word each. Note that initially $2N$ must equal some integral power of 2 for this to occur. When $p$ is equal to $\log_2(N/4)$, $\cos 2^pk\omega_0 t$ and $\sin 2^p\omega_0 t$, are equal to 0 or plus or minus 1. Thus, by folding the initial signal the Fourier transform, where expressed in terms of the Fourier coefficient may be determined with no multiplication and accumulation steps as was required for Computer I.

Figure 8:
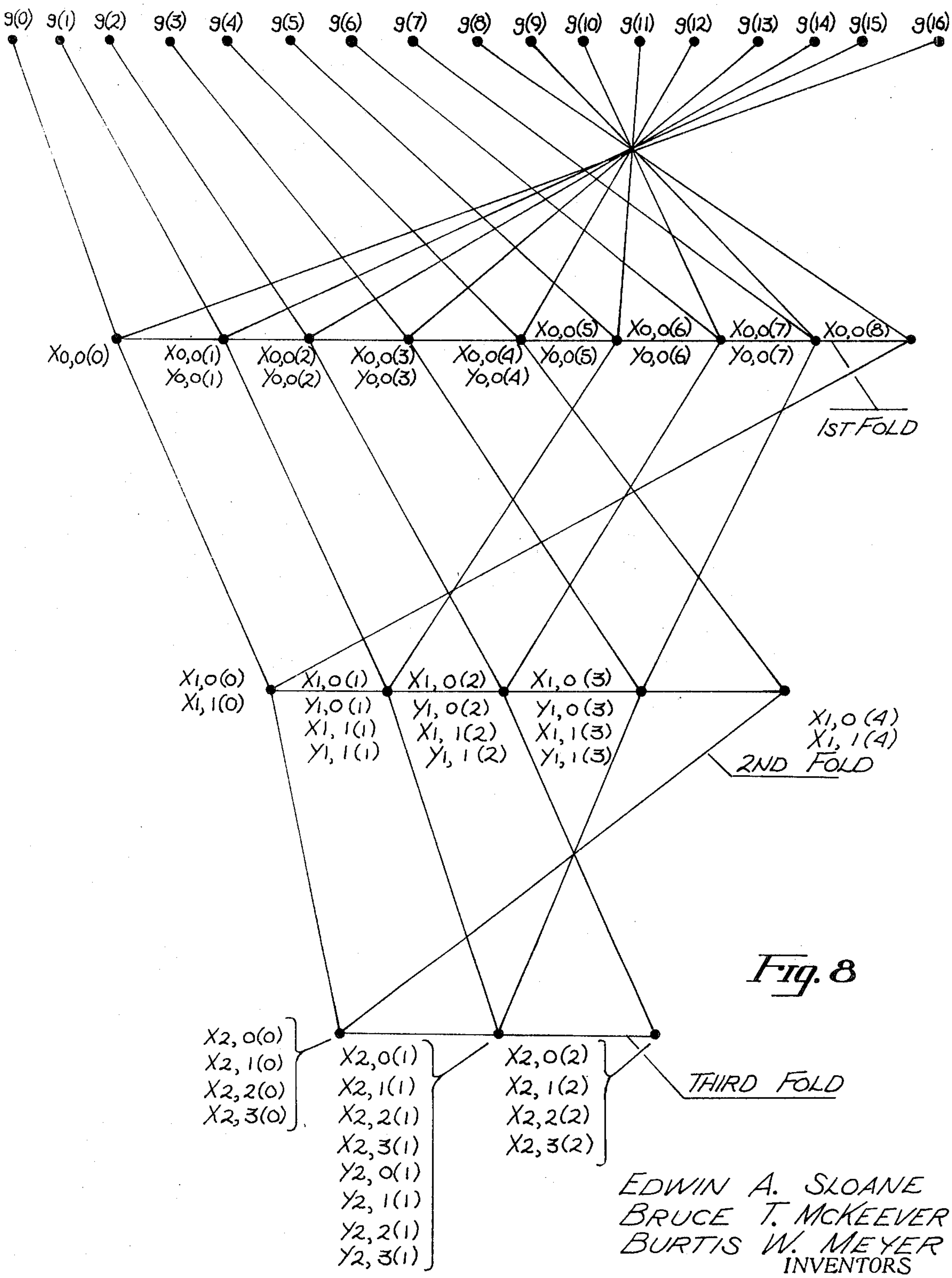
FIG. 8 illustrates the simple and complex folding for a 16 word input signal.

An example of the folding process is illustrated in FIG. 8. The small circles marked $g(0)$ through $g(16)$ represent an input signal which has been sampled 16 times. This corresponds to $g(t)$ previously used. Because of the implied periodicity of a finite discrete Fourier transform $g(0)$ is equal to $g(16)$. For the purpose of this illustration only, 16 samples of the input signal have been shown, typically over a thousand are utilized; but the principles herein disclosed apply to an input signal containing any number of samples, meeting the criteria discussed above.

The 16 samples are first folded in a simple (noncomplex) fold. This corresponds to equations 21 and 22. The lines connecting the samples $g(0)$ through $g(16)$ and the "first fold" line of circle are indicative of the data flow in the computer during the first fold. For example, circle $X_{0,0}(0)$ is connected to $g(0)$ and $g(16)$. This is stated in terms of equation 21 as $X_{0,0}(0)=g(0)=g(16-0)$. Note that $Y_{0,0}(8)$ and $Y_{0,0}(0)$ are equal to zero since $g(0)$ is equal to $g(16)$. As a result of the first fold, the initial input signal $g(t)$ has been converted into one group with a cosine ($X$) and sine ($Y$) part with each part containing approximately half as many words ($9X_{0,0}$ terms and $7Y_{0,0}$ terms).

The results of the second fold are indicated by circles along the line labeled 2nd fold. The new groups of words formed during the second fold correspond to equations 24 through 27. The lines connecting the first fold with the second fold indicate the data flow during the fold. Note that, in order to form some of the words in the second fold, complex multiplication is required, as indicated in equations 26 and 27. The number of groups contained in the first folded data has been doubled in the second fold, and each group now contains half as many words. Therefore, as a result of the second fold, the group of $9X$ terms and $7Y$ terms have been converted to 2 groups of $5X$ terms and $3Y$ terms (Note: $Y_{1,0}(0)=Y_{1,0}(4)-Y_{1,1}(0)=Y_{1,1}(4)=0$).

The third fold corresponds to equations 28 through 35. The two groups of the second fold are converted to four groups of $3X$ terms and $1Y$ terms in the third fold. (Note $Y_{2,0}(0)=Y_{2,1}(0)=Y_{2,0}(2)=Y_{2,1}(2)=0$). Thus, the 16 samples of the input signal have been reduced to four groups of four words. Now it is possible to compute the Fourier coefficients of the input signal without the multiplication and accumulation operations required for Computer I. This results in a considerable savings in processing time, thereby allowing a rapid determination of the Fourier transform of an input signal.

The Fourier coefficients may be computed from equations 44 and 45. It can be shown that the sinusoidal terms in these equations will always be one, minus one or zero and therefore no trigonometric values are needed to compute the coefficients. For example, applying equation 44 to $X_{2,0}(0)$ yields, $$X_{2,0}(t)=8\sum_{0}^{2}a_{4k}\cos 4k\omega_0 t,\ \text{thus}$$

$$X_{2,0}(0)=8[a_0+a_4+a_8],$$
$$X_{2,0}(0)=8[a_0-a_4+a_8],\ \text{and}$$
$$X_{2,0}(1)=8[a_0-a_8]$$

or applying equation 45 to $Y_{2,0}(1)$ yields $$Y_{2,0}(t)=8\sum_{4k}^{2}\sin 4k\omega_0 t$$

$$Y_{2,0}(1)=8[b_4]$$

Thus, all the Fourier coefficients associated with DC, maximum frequency and midfrequency may be computed from the two groups $X_2(t)$ and $Y_2(t)$ by solving simple simultaneous equations.

In the general case, determination of the Fourier coefficients requires the solution of eight simultaneous equations in eight unknowns involving two $X$ groups and two $Y$ groups.

$$2Na_q=[X_{n-2,q}(0)+X_{n-2,q}(2)+X_{n-2,q}(1)]+[X_{n-2,(N/4)-q}(0)-X_{n-2,(N/4)-q}(2)+Y_{n-2,(N/4)-q}(1)]$$

$$2Nb_q=[X_{n-2,q}(0)+X_{n-2,q}(2)+X_{n-2,q}(1)]-[X_{n-2,(N/4)-q}(0)-X_{n-2,(N/4)-q}(2)+Y_{n-2,(N/4)-q}(1)]$$

$$2Na_{(N/2)-q}=[X_{n-2,(N/4)-q}(0)-X_{n-2(N/4)-q}(2)+Y_{n-2,(N/4)-q}(1)]+[X_{n-2,q}(0)+X_{n-2,q}(2)-X_{n-2,q}(1)]$$

$$2Nb_{(N/2)-q}=[X_{n-2,(N/4)-q}(0)-X_{n-2,(N/4)-q}(2)+Y_{n-2,(N/4)-q}(1)]-[X_{n-2,q}(0)+X_{n-2,q}(2)-X_{n-2,q}(1)]$$

$$2Na_{(N/4)-q}=[X_{n-2,(N/4)-q}(0)+X_{n-2,(N/4)-q}(2)+X_{n-2,(N/4)-q}(1)]+[X_{n-2,q}(0)-X_{n-2,q}(2)-Y_{n-2,q}(1)]$$

$$2Nb_{(N/4)-q}=[X_{n-2,(N/4)-q}(0)+X_{n-2,(N/4)-q}(2)+X_{n-2,(N/4)-q}(1)]-[X_{n-2,q}(0)-X_{n-2,q}(2)-Y_{n-2,q}(1)]$$

$$2Na_{(N/4)+q}=[X_{n-2,q}(0)-X_{n-2,q}(2)+Y_{n-2,q}(1)]+[X_{n-2,(N/4)-q}(0)X_{n-2,(N/4)-q}(2)-X_{n-2,(N/4)-q}(1)]$$

$$2Nb_{(N/4)+q}=[X_{n-2,q}(0)-X_{n-2,q}(2)+Y_{n-2,q}(1)]-[X_{n-2,(N/4)-q}(0)X_{n-2,(N/4)-q}(2)-X_{n-2,(N/4)-q}(1)]$$

Where $n=\log_2 N$

DOUBLE COMPLEX FOLD

The previous discussion illustrated that groups of $X_{p,q}(t)$ and $(Y_{p,q}(t)$ words could be converted to $X_{p+1,q}$ and $Y_{p+1,q}$ groups by using a complex fold. It is the purpose of this section to illustrate that $X_{p,q}$ and $Y_{p,q}$ groups may be converted to $X_{p+2,q}$ and $Y_{p+2,q}$ groups in a single set of computations. Thus, by a complex double fold, the number of groups may be increased by a factor of four while the number of words in each group is reduced by a factor of four. As will be seen, the total number of computations required to perform the double complex fold is approximately equal to number of computations required to perform two single complex folds on the same data. The advantage to performing a double complex fold is not a savings in computation but rather results in a reduction in the total number of required memory accesses. The number of memory accesses required to produce the $p+2$ stage of folding from the $p$ stage is approximately halved by using a double complex fold. Since memory access time is generally longer than computation time, a reduction in total process time is achieved by using a double complex fold.

The conversion from complex fold stage $p$ to $p+2$ may be written in general terms as follows:

$$X_{p+2,q}(t)=X_{p,q}(t)+X_{p,q}(\tfrac{1}{2}T2^{-p}-t)+X_{p,q}(\tfrac{1}{4}T2^{-p}-t)+X_{p,q}(\tfrac{1}{4}T2^{-p}+t) \quad (46)$$

$$Y_{p+2,q}(t)=Y_{p,q}(t)-Y_{p,q}(\tfrac{1}{2}T2^{-p}-t)-Y_{p,q}(\tfrac{1}{4}T2^{-p}-t)+Y_{p,q}(\tfrac{1}{4}T2^{-p}+t) \quad (47)$$

$$X_{p+2,q+2.2p}(t)=[X_{p,q}(t)+X_{p,q}(\tfrac{1}{2}T2^{-p}-t)-X_{p,q}(\tfrac{1}{4}T2^{-p}-t)-X_{p,q}(\tfrac{1}{4}T2^{-p}+t)]\cos 2\cdot2^p\omega_0 t+[Y_{p,q}(t)-Y_{p,q}(\tfrac{1}{2}T2^{-p}-t)+Y_{ap,q}(\tfrac{1}{4}T2^{-p}+t)-Y_{p,q}(\tfrac{1}{4}T2^{-p}+t)]\sin 2\cdot2^p\omega_0 t \quad (48)$$

$$Y_{p+2,q+2\cdot2^p}(t)=[Y_{p,q}(t)-Y_{p,q}(1/2\,T2^{-p}-t)+Y_{p,q}(1/4\,T2^{-p}-t)-Y_{p,q}(1/4\,T2^{-p}+t)]\cos 2\cdot2^p\omega_0 t-[X_{p,q}(t)+X_{p,q}(1/2\,T2^{-p}-t)-X_{p,q}(1/4\,T2^{-p}-t)-X_{p,q}(1/4\,T2^{-p}+t)]\sin 2\cdot2^p\omega_0 t \quad (49)$$

$$X_{p+2,q+2^p}(t)=[X_{p,q}(t)-X_{p,q}(\tfrac{1}{2}T2^{-p}-t)+Y_{p,q}(\tfrac{1}{4}T2^{-p}-t)+Y_{p,q}(\tfrac{1}{4}T2^{-p}+t)]\cos 2^p\omega_0 t+[Y_{p,q}(t)+Y_{p,q}(\tfrac{1}{2}T2^{-p}-t)+X_{p,q}(\tfrac{1}{4}T2^{-p}-t)-X_{p,q}(\tfrac{1}{4}T2^{-p}+t)]\sin 2^p\omega_0 t \quad (50)$$

$$Y_{p+2,q+2^p}(t)=[Y_{p,q}(t)+Y_{p,q}(\tfrac{1}{2}T2^{-p}-t)+X_{p,q}(\tfrac{1}{4}T2^{-p}-t)-X_{p,q}(\tfrac{1}{4}T2^{-p}+t)]\cos 2^p\omega_0 t-[X_{p,q}(t)-X_{p,q}(\tfrac{1}{2}T2^{-p}-t)+Y_{p,q}(\tfrac{1}{4}T2^{-4Yp}-t)+Y_{p,q}(\tfrac{1}{4}T2^{-p}+t)]\sin 2^p\omega_0 t \quad (51)$$

$$X_{p+2,q+3.2^p}(t)=[X_{p,q}(t)-X_{p,q}(1/2T2^{-p}-t)-Y_{p,q}(1/4T2^{-p}-t)-Y_{p,q}(\tfrac{1}{4}T2^{-p}+t)]\cos 3\cdot2^p\omega_0 t+[Y_{p,q}(t)+Y_{p,q}(1/2T2^{-p}-t)-X_{p,q}(\tfrac{1}{4}T2^{-p}-t)+X_{p,q}(\tfrac{1}{4}T2^{-p}+t)]\sin 3\cdot2^p\omega_0 t \quad (52)$$

$$Y_{p+2,q+3.2^p}(t)=[Y_{p,q}(t)+Y_{p,q}(\tfrac{1}{2}T2^{-p}-t)-X_{p,q}(\tfrac{1}{4}T2^{-p}-t)+X_{p,q}(\tfrac{1}{4}T2^{-p}+t)]\cos 3\cdot2^p\omega_0 t-[X_{p,q}(t)-X_{p,q}(\tfrac{1}{2}T2^{-p}-t)-Y_{,q}(\tfrac{1}{4}T2^{-p}-t)-Y_{p,q}(\tfrac{1}{4}T^{-p}+t)]\sin 3\cdot2^p\omega_0 t \quad (53)$$

Thus, it is possible to convert from $p$ stage to $p+2$ stage without computation of the $p+1$ stage.

Computer II performs both a single and double complex fold. The desired end result of the folding is to achieve groups of three words. If this end result requires seven complex folds ($p=7$), Computer II performs three double complex folds and one single complex fold. The order in which the single or double complex folding is performed is not significant.

Figure 9:
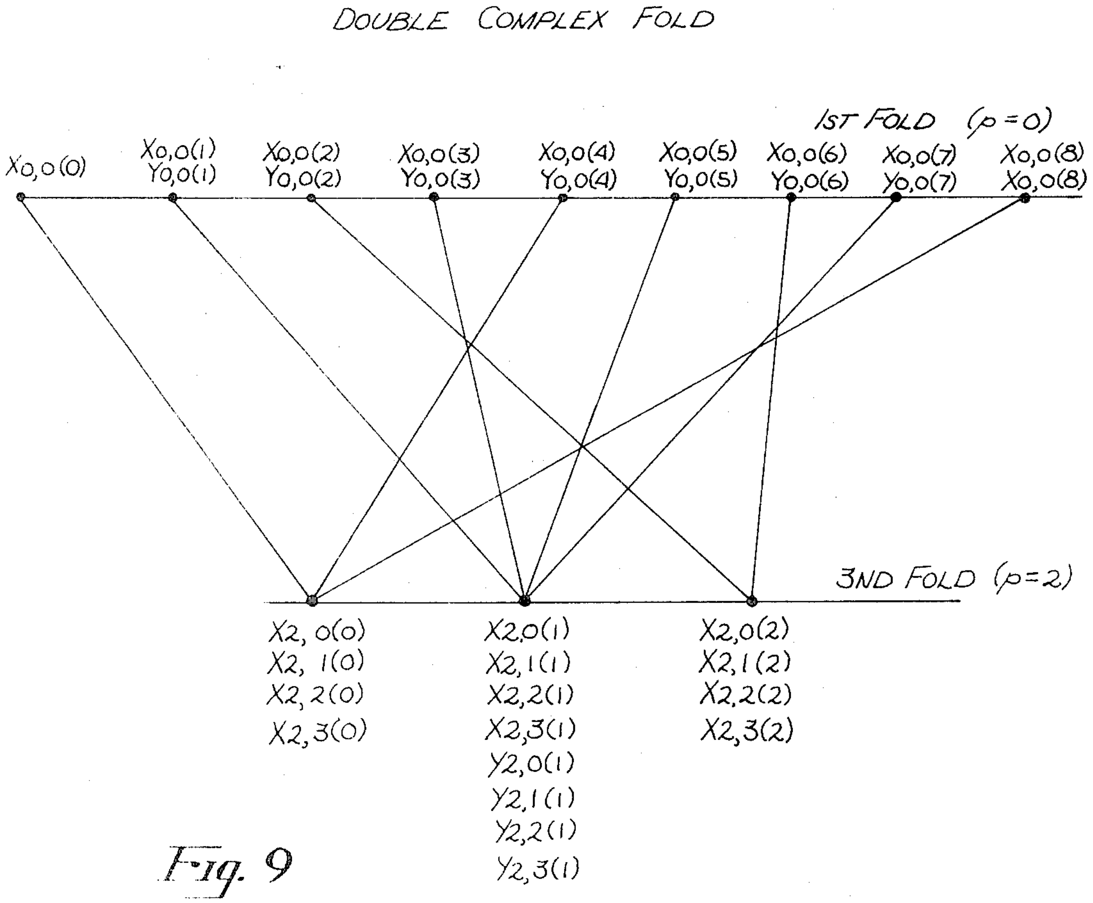
FIG. 9 illustrates a double complex fold.

FIG. 9 illustrates the double complex fold. The first fold ($p=0$) is the same data that was illustrated in conjunction with FIG. 8, after the $g(0)$ through $g(16)$ sample had been folded. The lines between the first and third folds of FIG. 8 illustrate the groups of words in the first fold required to compute the groups of words in the third fold. Each term or word in the four groups illustrated in the third fold may be computed from equations 46 through 53.

3. Computer I a. Description

Figure 5:
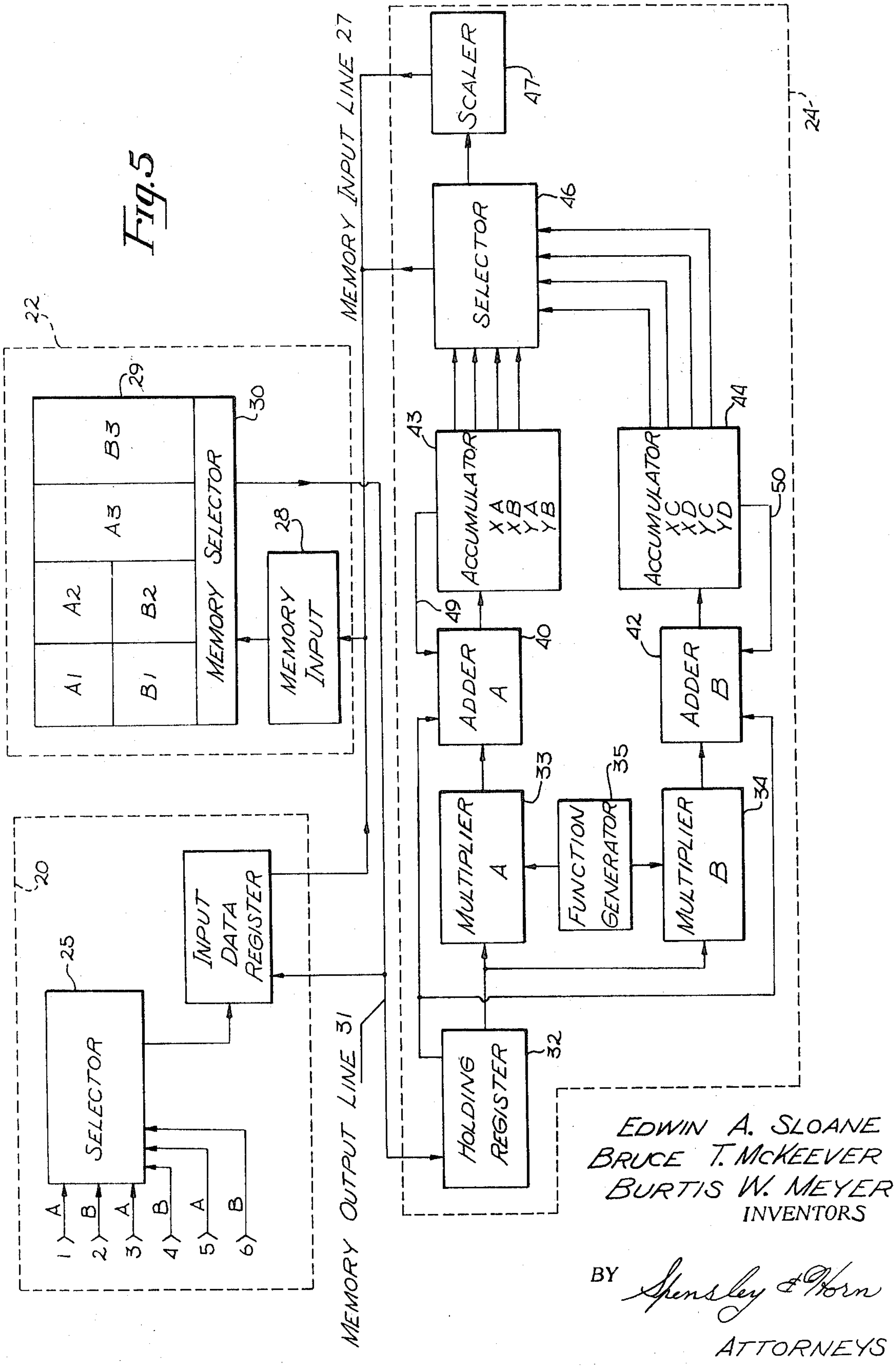
FIG. 5 is a system block diagram for the Fourier transform computer.

FIG. 5 is a block diagram for Computer I. The major subsystems of the computer as set forth in connection with FIG. 1 are the input subsystem 20; the storage subsystem 22; and the processor subsystem 24. The control and instruction logic subsystem 26 (FIG. 1) and interconnections between subsystem 26 and the remainder of the computer has not been shown in order to simplify the block diagram of FIG. 5. The significant signals supplied thereby and the interconnection with other units will be set forth when necessary to understand the important aspects of the invention.

In general, selector means 25 contains a shared analog to digital converter (hereinafter referred to as "A/D converter") and a switching means for coupling the A/D converter to a particular channel (e.g., A or B). The A/D converter is discussed in detail later in the specification in connection with FIG. 6. Selector means 25 receives input signals on one of four channels; analog channel A1, analog channel B2, digital channel A3, and digital channel B4. These inputs are the signals for which the computer obtains the Fourier transform. Timing channel A5 and timing channel B6 provide timing signal inputs indicating that the computer is to receive an input data sample in digital form. The switching means of selector 25 enables input data to be selected from either analog channels A or B or digital channels A or B. The selection of an input data channel may be made by the operator adjusting a selector switch. If data is selected from an analog channel, the switching means couples this data to the A/D converter and the information is converted to a sampled digital form. Timing signals required for the conversion of analog input data to digital data are provided by means 26. In the case of digital input data on digital channels A and B, timing signals may be supplied along with the digital inputs on the appropriate timing channel. The details of the switching circuitry and the A/D converter are well known in the prior art by one of ordinary skill. The circuitry may be constructed of discrete solid state circuitry or integrated circuits.

An input data register means 21 (FIG. 5) provides temporary storage for two eight-bit words. Register 21 contains a storage register for storing said words and an 18-pole two-throw switch. (Note: A 16-pole two-throw switch will perform the required function in register 21 of switching two eight-bit words. The additional two poles are utilized by the computer in performing computation other than the Fourier transform. These additional operations are not described nor claimed herein.) The two-throw switch enables register 21 to be coupled to and to receive data from either selector means 25, or memory output line 31 and to couple the data received from either one of these two means to memory input line 27. The switching means contained in register 21 is constructed in accordance with circuitry commonly employed in the prior art by one of ordinary skill. The storage register in register means 21 may be constructed from discrete or integrated solid state flip-flop circuitry or from commonly employed magnetic memory core devices or other memory devices.

Memory input means 28 contains a switching means comprising an 18-pole three-throw switch. Memory input means 28 is coupled to memory selector means 30, input data register means 21, accumulator selector means 46 and scaler means 47. The switching means 28 allows two eight-bit words to be coupled to memory selector 30 from either input data register means 21, accumulator selector 46 or scaler 47. The 18-pole three-throw switch may be constructed from solid state or integrated circuitry commonly employed in the art by one of ordinary skill.

Memory selector means 30 (FIG. 5) provides the circuitry to separately select or store each word within memory storage means 29. Selector means 30 is coupled to memory input means 28 and memory output line 31 and contain logic which enables the storage or removal of a word when the word's address is provided by means 26. Selector 30 provides readout, read-in and nondestructive readout cycles (commonly referred to as read, write and read-restore). In the latter cycle the data readout of memory 29 is replaced within memory 29 in the same location from which it was readout. Means 30 can be constructed of standard solid state circuitry utilizing well-known logic circuits.

Memory storage means 29 is the storage means for the computer. Typically, storage means 29 is capable of storing 4,096 18-bit words and is divided into six sections. Sections A1, B1, A2 and B2 are each capable of storing 1,001, eight-bit words and are used to store inprocess data. Each eight-bit word in Sections A1 and B1 share an 18-bit location within memory 29. These sections are coupled to selector 30. A3 and B3, coupled to selector 30 are each used to store the output data and are each capable of storing 1,001, 18-bit words. Memory storage means 29 may be a commercially available magnetic memory core storage commonly utilized in the computer art.

Holding register means 32 (FIG. 5) provides temporary storage for 18 bits of information and contains an 18-pole two-throw switch. Register 32 is coupled to multiplier means 33 and 34, memory output line 31, and adder means 40, and 42. The two-throw switch allows 18 bits of information (typically two eight-bit words) to be applied from the memory output line 31 to either means 40 and 42 or multiplier means 33 and 34. Holding register means 32 may be constructed of commonly utilized discrete solid state or integrated circuitry, and its construction may be similar to register 21.

Multiplier 33 and 34 provides for the multiplication of data such as the multiplying of two eight-bit words resulting in a digital product. One word is supplied to multiplier 33 and 34 by function generator means 35 and the other word is supplied from holding register 32. Multipliers 33 and 34 are coupled to function generator 35 and holding register 32 and has its outputs coupled to adders 40 and 42. Multipliers 33 and 34 are digital multiplication means of a type commonly used in the computer art.

Function generator means 35 supplies eight-bit words representative of trigonometric functions to multipliers 33 and 34. Each eight-bit word contains seven bits of data and one sign bit. The trigonometric functions provided by function generator 35 is the sine and cosine of a fundamental frequency and 500 harmonics sampled at angular increments corresponding in time to the sample points of the input data supplied to means 25. Function generator 35 may be constructed of ordinary logic circuitry with a storage matrix to store the sine and cosine data. A further description of one such function generator 35 is provided herein.

Adder means 40 and 42 are conventional digital arithmetic devices for addition and subtraction commonly utilized for computers. Adders 40 and 42 are coupled to accumulators 43 and 44 respectively, multipliers 33 and 34 respectively, and holding register 32. Adders 40 and 42 are each capable of adding two digital words and each contain two selectors, one to couple the adder with an accumulator and the other to couple the adder to the source of the other addend. The addend data may be selected from holding register 32, multiplier 33 or multiplier 34. In addition, the sums produced by adder means 40 and 42 may be transmitted to one or more sections within accumulator 43 and 44, respectively. Adders 40 and 42 may be constructed of commonly employed adder means well known in the computer art.

Accumulators 43 and 44, coupled to adders 40 and 42 respectively and selector 46, perform accumulation functions in conjunction with adders 40 and 42. Both accumulator 43 and 44 are divided into four sections; sections XA, XB, YA and YB are the four sections of accumulator 43, and sections XC, XD, YC and YD are the four sections of accumulator means 44. Each section of each accumulator is capable of providing temporary storage for an 18-bit word. Accumulators 43 and 44 each contain an 18-pole four-throw switch in order that the data stored in any section may be coupled to line 49 and 50 respectively, for use in adders 40 and 42. The data contained in any accumulator section may be read out of that section, without destroying the contents of that section (nondestructive readout). Accumulators 43 and 44 may be constructed of well-known solid state circuitry and are similar in construction to registers 21 and 32.

Selector 46 contains switching circuitry to allow any section of accumulator 43 or 44 to be coupled with either memory input line 27 or scaler 47. Selector 46, coupled to accumulators 43 and 44, memory input line 27 and scaler 47, is constructed of well-known solid state switching circuitry.

Scaler 47 is a means for dividing a digital word by a factor of 2. Division of a digital number by the factor of 2 may be accomplished by commonly known digital techniques such as shifting a word by one bit. Scaler 47, coupled to a selector 46 and memory input line 27, may be constructed of commonly utilized digital circuitry.

Control and instruction logic means 26 (not shown) provides the timing control and instruction logic for the computer and is coupled to means 25, 21, 28, 30, 32, 33, 34, 35, 40, 42, 43, 44, 46 and 47. Means 26 provides the logic, timing and memory address signals needed to operate the computer. The timing signals are provided from a timing clock. The construction of the timing clock is similar to that employed in the computer art. The instruction logic signals and switching signals are provided by logic circuitry in order to perform the nine cycles described below. The logic and instruction circuitry may be constructed of standard logic circuitry well known in the art and can readily be constructed once the operation of the computer is understood.

The above description of Computer I illustrates only those components and interconnections necessary to perform the Fourier computation. Computer I, with minor modification, is capable of performing other algorithms not the subject of this invention.

b. Operation

The following description of the operation of Computer I will assume that an analog signal has been applied to channel A of selector 25 (FIG. 5). While the computer illustrated is capable of computing the Fourier transform for two input signals simultaneously, it does not have the storage capacity for storing the real and imaginary components for both transforms. Additional storage space could be added to means 29 if it were desired to store the transform of two input signals. Where the transform of a signal is not stored but rather used immediately for additional computations as in the case of the Auto Spectral algorithms, simultaneous performance of Fourier transform on both channels A and B is utilized.

The process for obtaining the Fourier transform by the invented Computer I can be divided into nine cycles:

Cycle 1—input data cycle;

Cycle 2—first fold;

Cycle 3—computation of transform coefficients utilizing odd cosine functions;

Cycle 4—computation of transform coefficients utilizing odd sine functions;

Cycle 5—second fold;

Cycle 6—computation of transform coefficients utilizing even cosine functions in the series $f_0, f_4, f_8, f_{12} \ldots$;

Cycle 7—computation of the transform coefficients utilizing even sine functions in the series $f_0, f_4, f_8, f_{12}$;

Cycle 8—computation of transform coefficients utilizing even cosine functions in the series $f_2, f_6, f_{10} \ldots$;

Cycle 9—computation of transform coefficients utilizing even sine functions in the series $f_2, f_6, f_{10} \ldots$ Cycle 1

On command of the control and instruction logic subsystem 26, an input data signal is accepted on analog channel A1 by selector 25. Selector 25 samples the amplitude of the input signal and converts the signal into 1,001 8-bit words (seven bits of value and one sign bit). The data samples are taken at equally spaced intervals along the time axis of the input signal. These samples or words are accepted by input data register means 21 and transmitted to memory input means 28 via memory input line 27, memory input means 28 and memory selector 30; and stored in section A1 of memory 29. Control and instruction logic means 26 provides an address for each word before it is stored in memory 29. After the entire input data signal of 1,001 words is stored, cycle 1 is completed and control and instruction logic means 26 then begins cycle 2.

Cycle 2

During cycle 2, the first fold of the input data as discussed in Sections 2*a* of this application is performed. The first fold is represented in the mathematical explanation of Computer I by the symbols $\Sigma_n$ and $\Delta_n$. At the beginning of cycle 2, on command from control and instruction logic means 26, the 501st input data sample is removed by memory selector 30 from section A1 of memory 29 (note that the 501st word represents $A_0$ and $\Sigma_0$ indicated previously in the mathematical explanation of Computer I). $A_0$ is transmitted to adder means 40 through memory output line 31 and holding register 32. No operations are performed on this word and it is transmitted through section XA of accumulator 43 to scaler 47 where it is divided by two and returned to section A2 of memory 29, via memory input line 27, where it is stored. Next, on command from control means 26 the word corresponding to $A_{+1}$ is transmitted to holding register 32 and then to accumulators 43 and 44 sections XA and XC, through adders 40 and 42, respectively. Then the word corresponding to $A_{-1}$ is removed from memory 29 section A1 and transmitted to adders 40 and 42. Accumulator 43 and 44 then return word $A_{+1}$ to adders 40 and 42 through leads 49 and 50, respectively. In adder 40 the quantity $(A_{+1}+A_{-1})$ is formed and in adder 42 the quantity $(A_{+1}-A_{-1})$ is formed. These quantities are transmitted to scaler 47 where they are divided by two forming $(A_{+1}+A_{-1})/2$ and $(A_{+1}-A_{-1})/2$ and these new quantities are stored in section A2 of means 29. This operation is repeated until each of the samples of the initial data signal are folded and stored in section A2, means 29. The last quantities formed are $(A_{500}+A_{-500})/2$ and $(A_{500}-A_{-500})/$. (If signals had been received on both channel A1 and B1 of Computer I, the signal received on channel B would be stored in section B1 of memory 29. After the fold, the data would be stored in section A1, the data contained in B1 would be folded and stored in section B2. It should be noted that section A2 of memory 29 contains storage means for eight-bit words, the results of the first fold are divided by two in scaler 47, to reduce the data to eight bits. Since every $\Sigma$ and $\Delta$ is divided by two, the equations developed in Section 2*a* may be utilized, bearing in mind that the computed Fourier transform is then proportional to the actual transform. After the formation of the quantities $(A_{500}+A_{-500})/2$ and $(A_{500}-A_{-500})/2$, the first fold and cycle 2 are completed.

Cycle 3

During cycle 3 the coefficients of the Fourier transform are computed for those coefficients utilizing odd cosine functions in their computation. These are the coefficients shown in equations 1 and 3 in Section 2*a* of this application.

Upon command from control and instruction logic means 26, the quantity corresponding to $A_0$ is transmitted to multiplier means 33 via memory output line 31 and holding register 32. Simultaneously, the appropriate cosine value for $C_0$ for $f_1$ is generated by function generator 35 and transmitted to means 33 where the product $C_0A_0$ is computed. This quantity is then transmitted through means 40 and stored in accumulator sections XA and XB of accumulator 43. Following this, the word corresponding to the quantity $(A_1+A_{-1})$ is selected from memory means 29 section A2 and transmitted to multiplier 33. Simultaneously, function generator 35 generates the cosine value for $C_1$ at the frequency $f_1$. (Note that the angular increment used to determine the cosine value of $C_0$, $C_1$, $C_2$, etc., corresponds in time to the sample $A_n$ of the input signal.) Multiplier means 33 then performs the multiplication that results in the product $C_1(A_1+A_{-1})$. This product is transmitted to adder 40. The quantities $C_0A_0$ previously stored in accumulator section XA is returned to adder 40 via lead 49; adder 40 then calculates the sum of $C_0A_0+C_1(A_1+A_{-1})$. This sum is then returned to accumulator section XA of accumulator 43. Next, the difference of these quantities $C_0A_0-C_1(A_1+A_{-1})$ is calculated in adder 40 and returned to section XB of accumulator 43. (Note that adders 40 and 42 are capable of both adding and subtracting and do so at the appropriate time upon command from control and instruction logic means 26.) This multiplication and adding and subtraction operation is repeated until the quantity $A_{500}+A_{-500}$ is utilized in the computation. Accumulator section XA of accumulator 43 will then contain the accumulation designated by equation 1 (low frequency) and accumulator XB contains the accumulation designated by equation 3 (high frequency). Note that in equation 3 the accumulation in section XB must be alternately added and subtracted with the products of multiplier 33. This alternate adding and subtracting is referred to as toggling herein and is controlled by a flip-flop circuit in control and instruction logic means 26. Cycle 3 is completed when the accumulator sections XA and XB have received the final addition from means 40, containing quantity $A_{500}+A_{-500}$ and $A_{500}-A_{-500}$.

Cycle 4

During cycle 4, the coefficients of the Fourier transform are computed for those coefficients utilizing odd sine harmonics in their computation. Cycle 4 repeats the basic operations described in cycle 3 except that function generator generates the appropriate sine value instead of the cosine value. The imaginary coefficients computed during this cycle correspond to those shown in equation 2 and 4 of section 2*a* of this application. The resultant low-frequency term of equation 2 are stored in accumulator section YA and the high-frequency term shown in equation 4 are stored in accumulator section YB.

After the last addition needed to complete equations 2 and 4 are computed by adder 40, accumulator 43 contains the real and imaginary, high-frequency and low-frequency coefficients utilizing the frequency $f_1$ in their computations. These coefficients are then transmitted to memory section A3 and B3 where they are stored. The real coefficients are stored in section A3 and the imaginary in section B3. Cycle 3 and 4 are then repeated for each odd harmonic $(f_3, f_5, f_7 \ldots)$ until all the Fourier coefficients utilizing odd harmonics in their computation are computed.

Note that after the completion of cycle 3, the computed coefficients may have been stored, rather than computing the corresponding imaginary coefficient (cycle 4) and then storing all four coefficients. The present technique, of computing both the real and the imaginary coefficients for every odd frequency before storing these coefficients, is to facilitate computation in another algorithm performed by Computer I, not described nor claimed herein. In that algorithm additional computations are performed on the real and imaginary coefficients for each frequency.

Note also that each time a quantity corresponding to $\Sigma_n$ or $\Delta_n$ is read out of section A2 of memory 29, it is returned to its previous location by selector 30. This was previously referred to as the nondestructive readout cycle of memory selector 30.

Cycle 5

During cycle 5, the second data fold discussed in Section 2*a* of this application is performed. The quantities corresponding to $\Sigma\Sigma_n$, $\Delta\Delta_n$, $\Sigma\Delta_n$, $\Delta\Sigma_n$ are formed. The second fold proceeds in the same manner as the first fold described in cycle 2. For example, expressed in general terms, the quantity $\Sigma_n$ is read out of section A2 of memory 29 and transmitted to accumulator sections XA and XC of accumulator 43 and 44 respectively, via memory output line 31, holding register 32 and adder 40 and 42. Next, the terms $\Sigma_{N-n}$ is transferred to adder 40 via memory output line 31 and holding register 32. In adder 40 the quantity $\Sigma\Sigma_n$ is formed and transmitted to accumulator section XA. By a similar process the quantities $\Sigma\Delta_n$, $\Delta\Sigma_n$ and $\Delta\Delta_n$ are computed and stored in the accumulator sections of accumulators 43 and 44. These four quantities are then returned to memory 29 via selector 46, scaler 47, input memory line 27 and memory input line 28. These quantities are stored in section A2 of memory 29 in the same location with the $\Sigma_n$ and $\Delta_n$ information had been previously stored.

Cycle 6

During cycle 6, the real coefficients utilizing the cosine frequencies $f_0, f_4, f_8, f_{12}$ . . . as shown in equation 5 and 7 are computed. Cycle 6 is similar to cycle 3. For each frequency generated by frequency generator means 35 the corresponding low-frequency coefficient is stored in accumulator section XA and the equivalent high-frequency coefficient is stored in accumulator section XB of accumulator 43. Note that toggling is again used with the accumulation stored in accumulator section XB in order to obtain the alternating sign shown in equation 7.

Cycle 7

In cycle 7, the imaginary coefficients utilizing the sine frequencies $f_0, f_4, f_8, f_{12}$ . . . are computed. These computations correspond to equations 6 and 8 previously discussed. This cycle proceeds in the same manner as cycle 4. Once again, the imaginary coefficients computed during cycle 7 are stored in accumulator section YA and YB of accumulator 43.

After the four coefficients, low frequency, high frequency, both real and imaginary for each frequency corresponding to frequencies $f_4, f_8, f_{12}$, etc., have been computed and stored in accumulator 43 they are then transmitted to memory 29 via selector 46, memory input line 27 and memory input means 28 for storage in sections A3 and B3. The real components are stored in section A3 and the imaginary section B3. As previously explained, this procedure of computing the real and imaginary components for each frequency is performed to facilitate an algorithm not described nor claimed herein. Once again, cycle 6 and 7 are repeated for every frequency generated by function generator 35 in the series $f_4, f_8, f_{12}$, etc.

Cycle 8

During cycle 8 the real coefficients utilizing the frequencies $f_2, f_6, f_{10}$ . . . are computed. These coefficients are the coefficients shown in equations 9 and 10 of section 2*a* of this application. Cycle 8 proceeds in the same manner as cycle 6. Toggling as described above is again used to obtain the alternating signs shown in equation 10. As was the case in cycle 6, the low-frequency coefficients are stored in accumulator section XA and the high-frequency coefficients are stored in accumulator XB of accumulator 43.

Cycle 9

During cycle 9, the imaginary coefficients utilizing the sine frequencies corresponding to $f_2, f_6, f_{10}$ are computed. These are the imaginary coefficients shown in equations 11 and 12. Cycle 9 is similar to cycle 7 with the low-frequency imaginary coefficients stored in accumulator section YA and the equivalent high-frequency coefficients stored in accumulator section YB. As was the case with cycle 6 and 7, when the four coefficients utilizing any sinusoidal frequency in the series $f_2, f_6, f_{10}$ are contained in accumulator 43 sections XA, XB, YA and YB, the coefficients are then transmitted to sections A3 and B3 of memory means 29 for storage. Cycle 8 and 9 are repeated for every frequency in the series $f_2, f_6, f_{10}$, etc. Upon completion of cycle 9 for the highest harmonic, the entire Fourier transform, both real and imaginary, are stored in sections A3 and B3 of memory 29.

Thus by utilizing the quarter and half-wave symmetry of sinusoidal functions and by choosing harmonics corresponding to exact submultiples of the sampling rate, the above-described computer has greatly reduced the number of computations normally required to calculate the coefficients in the Fourier transform. In addition, because of the arrangement of the holding register, multiplier, adder and accumulator means described herein, maximum utilization is achieved for each of these means. That is, simultaneous memory access, multiplication and addition may be performed in Computer I. This "-pipelining" of the computational means in Computer I provides a further reduction in the process time to obtain the Fourier transform.

c. Analog to Digital Converter

Figure 6:
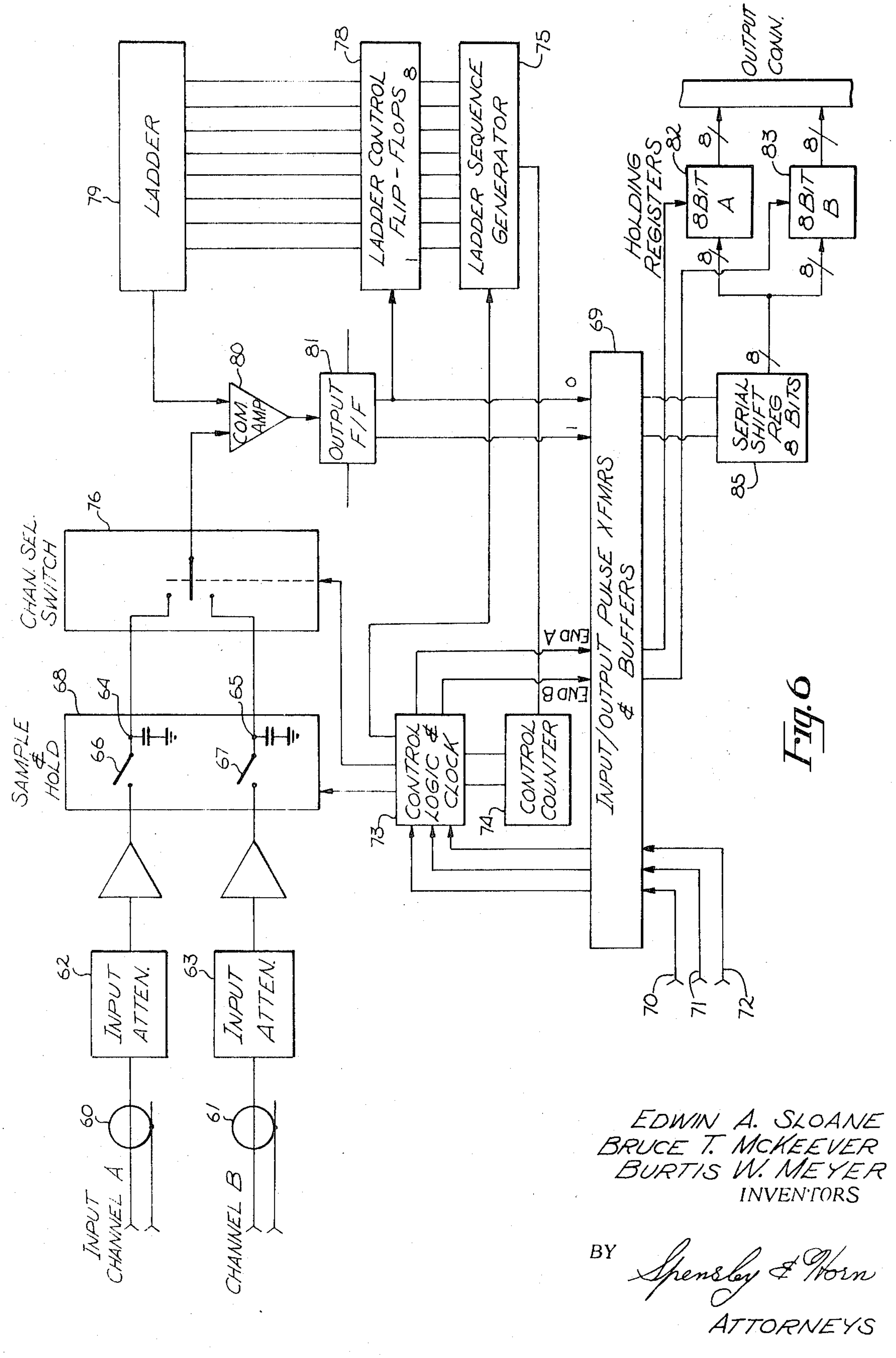
FIG. 6 is a block diagram for the analog to digital converter.

FIG. 6 is a block diagram of the analog to digital (A–D) converter. The A–D converter which is part of selector 25 (FIG. 5) performs input sampling functions and converts the input data into an 8-bit digital form compatible with the digital form utilized by the processors subsystem 24. Each of the means shown in FIG. 6 are commonly utilized means known to one of ordinary skill in the computer art.

The entire A–D converter is electrically isolated from the remainder of the computer. This is done to allow external buffer amplifiers to be used on input channels A and B. The input and output pulse transformers and buffers for the A–D converter are contained in means 69.

Input data to the A–D converter is applied to input channel A and input channel B shown as connector 60 and 61 respectively. The input signals are transmitted to attenuators 62 and 63. The function of the input attenuators is to assure that the maximum amplitude of the input signal is compatible with the 8-bit words utilized by the processor. That is, the attenuators assure that the entire dynamic range of the input signal is converted into digital form.

The converter operates on command of one of three signals supplied to terminals 70, 71 or 72. Signal supplied to terminal 70 provides a start signal when information is communicated to terminal 60 (channel A). The terminal 71 receives a similar signal when information is received on terminal 61 (channel B). Terminal 72 receives the start signal for the A–D converter when data is to be received on both terminal 60 and 61. The control and instruction logic subsystem 26 provides the signals to terminal 70, 71 or 72 based on the selection made by the operator.

Assuming a signal is received on terminal 72, control logic and clock 73 is enabled. Clock 73 first closes switches 66 and 67 of sample and hold means 68 allowing the input signal on terminal 60 and 61 to be sampled. The sampled voltage is stored on capacitor 64 and 65. Simultaneously, clock 73 sends signals to control-counter 74 and ladder sequence generator 75. These signals clear both these means and prepare them to begin the analog to digital conversion. In addition, the signal to counter 74 enables the eight-state counter to begin counting. Next, a signal from control logic and clock 73 closes switch means 76, in a position to couple capacitor 64 with amplifier 80.

The first step in the analog to digital conversion is the determination of the sign of the input sample stored on capacitor 64. On a signal from control logic and clock 73, ladder sequence generator 74 through ladder control flip-flop 78 and ladder 79 causes ladder 79 output to center at 0 volts. This 0-volt signal is compared in comparative amplifier 80 with the signal stored on capacitor 64. Comparator amplifier 80, sets flip-flop 81 to indicate a "one" if the voltage stored on capacitor 64 is greater or equal to the zero ladder voltage and a "-zero" if the voltage is less than zero units. This initial one or zero is the sign bit of the 8-bit word. If the sign bit is a "zero," it is transmitted to ladder control 78 by flip-flop 81 and is utilized in the subsequent conversion by causing the output of ladder 79 to always be negative. If the output of flip-flop 81 had been a "one," no signal would have been received by ladder control 78 and the subsequent output from ladder 79 would have been positive. After the completion of the determination of the sign bit, generator 75 indicates that the first step in the calculation of the 8-bit digital word is completed to countercontrol 74. Upon receipt of this signal via counter 74, clock 73 initiates the next step in the computation of the 8-bit word.

Upon receipt of the next signal from clock 73, ladder sequence generator via ladder control flip-flop 78 and ladder 79 generates a voltage proportional to the most significant bit ($2^6$). If the sign bit previously calculated was a "one" ladder 79 retains a positive signal corresponding to $2^6$. If a "zero" was generated by flip-flop 81 for the sign bit, ladder 79 removes a voltage corresponding to $2^6$. This voltage is compared with the input signal stored in capacitor 64, if the ladder voltage is greater than the input voltage a "zero" is set in output flip-flop 81 and if the input voltage is greater than the ladder voltage a "one" is set in flip-flop 81.

Each "one" or "zero" from flip-flop 81 is read into serial shift register 85 through buffer means 69. In the case where a zero is read into means 78, the voltage corresponding to $2^6$ is removed and not used in the next comparison.

Upon completion of the second count, the sequence is repeated by next utilizing the voltage corresponding to $2^5$ and comparing it with the voltage stored on capacitor 64 in comparative amplifier 80. If a "one" had been generated in the previous comparison, the output of ladder 79 would correspond to the sum of $2^6$ plus $2^5$. This sequence is repeated for all seven bits representing the value of the word stored on capacitor 64.

After serial shift register 85 has received the last bit of the 8-bit word, the word is read in parallel to holding register 82. The output of holding register 82 and 83 is coupled with the output of the input subsystem 20 (FIG. 1).

The above-described conversion is repeated, for the voltage on capacitor 65. For this conversion, switch means 76 couples capacitor 65 with amplifier 80. The 8-bit word, representing the analog signal on capacitor 65 is serially read into shift register 85 then shifted in parallel to holding register 83.

The sampling of the input signal by sample and hold means 68 is repeated 1,001 times thereby converting each analog input signal to 1,001 8-bit words.

If a signal had been received on terminal 70, instead of terminal 72, switch means 76 would not couple capacitor 65 with amplifier 80 and hence only the signal received on terminal 60 (channel A) would be converted to digital form. Similarly, if a signal had been received on terminal 71, only the signal received on terminal 61 (channel B) would have been converted.

d. Trigonometric Means

Figure 7:
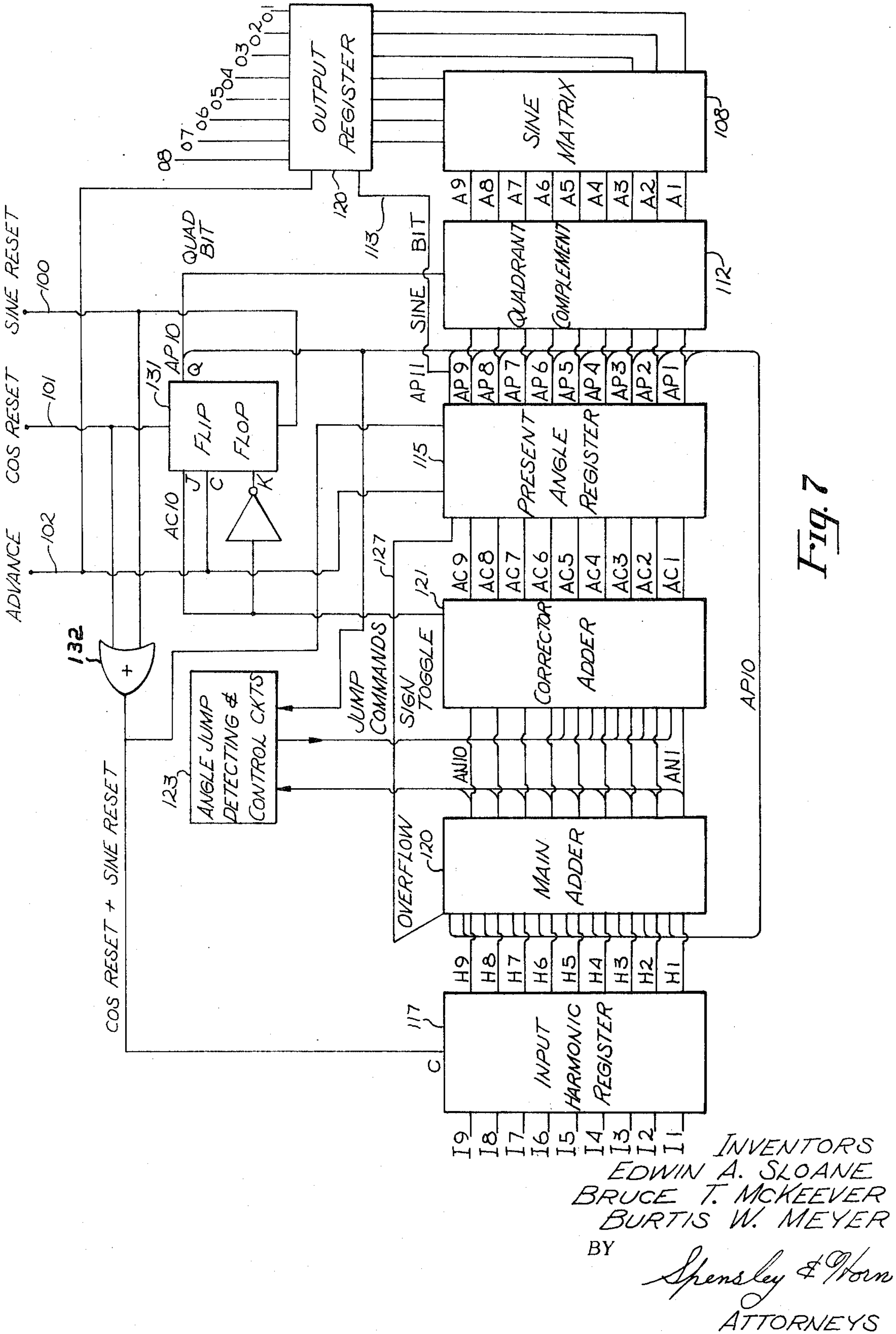
FIG. 7 is a block diagram for the trigonometric means.

A block diagram of a trigonometric means, suitable for use as function generator 35 of FIG. 5, is shown in FIG. 7. The function generator provides sine and cosine functions for the computation of the Fourier transform. The sine and cosine outputs are produced as digital 8-bit words, seven bits of value and one sign bit, this allows 127 positive and 127 negative discrete amplitude values to be produced by the generator. Outputs are available at 500 discrete angular increments in each quadrant, corresponding to one-half of the number of intervals between the samples of the input signal. The values of the base or fundamental sine and cosine frequency ($f_0$) used in the transform are produced by a stepping the function generator through increments one at a time. Harmonic functions are produced by advancing the generator by a number of increments corresponding to the required harmonic number, in effect multiplying its angular frequency by the harmonic number. It should be recalled that the function generator provides samples of trigonometric functions at the same interval points as those at which the input signal is sampled. That is, each angular increment corresponds in time to the period between the samples of the input signal. Note the samples of the input signal are taken at evenly spaced intervals along the time axis, thus the angular increments of the generators are evenly spaced angular increments.

As shown in FIG. 7, the function generator receives four input control signals from control instruction logic means 26 of FIG. 1; a sine reset on lead 100, a cosine reset on lead 101, an advance signal on lead 102 and a nine-bit input on leads I1 through I9. The sine and cosine reset inputs to the generator determine whether the generator will produce sine or cosine functions. The advance signal 102 causes the generator to increment from one angle to the next. The first angle being the angle corresponding to $C_0$ and the $n^{th}$ angle corresponding to $C_n$ as discussed in section $2a$ of this application. The inputs I1 through I9 indicate the harmonic number in binary form of the frequency for which the sine and cosine function are required. A "one" on lead I and "zeros" on leads I2 through I9 indicates the fundamental frequency, $f_0$.

The sine matrix 108 produces the actual trigonometric values. The matrix receives a nine-bit input word in binary form representative of the angle for which the trigonometric function is sought. The input to the sine matrix is designated by lead A1 through A9, representing the position of the desired one of the possible 500 angles within matrix 108. The angle address is decoded in matrix 108 to produce the corresponding one of the possible 127 discrete amplitude values. The amplitude is then encoded to a seven-bit word and applied to output register 130 along with the algebraic sign bit which is derived separately from the angle address logic. The value of the sine and cosine function is produced on lead 01 through 07, and the sign bit on lead 08, for use by computer I.

Assume for purposes of explanation that it is desired to generate a sine functions with a frequency corresponding to $f_0$. In order for this to occur, a sine reset signal would be received on lead 100. This signal would set flip-flop 131 such that no output (a "zero") occurs at the Q-output of the flip-flop on lead AP 10. The sine reset signal would also be applied to register 117 since the logic of gate 132 would be satisfied. Gate 132 will produce an output if either a sine reset or cosine reset signal are received. The signal applied to register 117 from gate 132 allows the register to sense the binary word applied on leads I1 through I9. Since the harmonic to be developed is $f_0$, the inputs I1 would be a "one" and the inputs I2 through I9 would be all "zeros." Register 117 stores this word on command from gate 132. The output signal of gate 132 is also applied to present angle register 115. This signal clears the register so that the output of the register 115 (AP 1 through AP 11) exclusive of AP 10 are all "zeros." Since flip-flop 131 is set such that lead AP 10 contains a "zero," no quadrant bit is applied to quadrant complementer 112. This means that the output of present angle register 115 passes directly through quadrant complementer 112 into matrix 108.

Advance signals are applied to lead 102 indicating that the first angle corresponding to $C_0$ is required by the processor. When a signal is applied to lead 102, present angle register accepts the output of corrector adder 121 and the angle stored in register 115 is transmitted to complementer 112. When the first advance signal is received, the sine matrix receives all "-zeros" on lead A1 through A9 since the present angle register was cleared by the sine reset signal and complementer 112 is not activated by the quadrant bit. The "zero" input to matrix 108 produces a zero output, which is the appropriate sine value. This output is transmitted to register 130.

The first advance signal also causes the contents of register 115, leads AP 1 through AP 10 to be added to the contents of register 117 in adder 120. The output of adder 120 is transmitted to register 115 via corrector adder 121. No operation is performed by adder 121 at this time. The output of main adder 120 consists of the sum of the word stored in the input harmonic register and the word in the present angle register. At this time therefore, the output of main adder 120 will be a one (a "one" on lead AN1) and present angle register 115 contains all "zeros." The "one" on lead AN1 is transmitted through corrector adder 121 into present angle register 115, quadrant complementer 112 and then into matrix 108 on the second advance signal. In matrix 108 the angle corresponding to $C_1$ for $f_0$ is transmitted to output register 130.

The advance signal on lead 102 is also applied to the control lead C of flip-flop 131 allowing the flip-flop to sense any signal that may exist on lead AC 10. At this time there is no signal on lead AC 10 and flip-flop 131 remains in a position such that no output exists on lead AP 10.

The addresses to present angle register 115 are then incremented through the first quadrant of increasing since values up to the maximum. This occurs since the "one" in register 117 is repeatedly added to the contents of register 115. When the last address of the first quadrant has been detected by angle jump detection and control circuits 123 (a count equal to 501) means 123 then adds 11 to the output of the main corrector adder 121 forcing the count to 512. When this occurs, the output of corrector adder 121 (leads AC 1 through AC 9) become all "zeros" and AC 10 becomes a "one." On receipt of the next advance signal, the bit on lead AC 10 cause flip-flop 131 to change its state, and a "one" appears on lead AP 10. This activates quadrant complementer 112.

When quadrant complementer 112 is activated, the complement of the output of present angle register 115 is transmitted to matrix 108, thus, when present angle register 115 begins counting on leads AP 1 through AP 9 from zero the output of complementer 112 begins decrementing, providing matrix 108 with the proper angle address for angles in the second quadrant.

An additional compensation is required for the complemented address used for the second quadrant. The second quadrant must end at angle address 0. Therefore the complementing address bits AP 1 through AP 9 must be all "ones," e.g., a count of 511 at the end of the second quadrant. Corrector adder 121, on command from means 123, provides an addition count of 12 causing the first present angle address (noncomplemented) of the second quadrant to 11. When this address, in binary form, is complemented, it becomes the same as the last address of the first quadrant (i.e., 500). Thus, the complemented second quadrant addressing begins at 500 (for maximum sine amplitude) and decrements to zero. To provide this total correction, the corrector adder 121 adds 23 whenever a next angle address of 501 or more is detected by means 123.

In the second quadrant, the present angle register 115 continues to increment upward from 11. When address bits AP 1 through AP 9 are all "ones" and, the quadrant bit AP 10 is "one," the second quadrant is completed. This present angle condition added to the next increment provides a next angle output of the main adder of all "zeros" plus an overflow signal on lead 127. The next advance signal 102 thus sets the sign bit AP 11 and clears AP 1 through AP 10 to "zeros." These are the conditions for the start of the third quadrant.

A sign bit is provided directly to output register 130 on lead 113. A flip-flop circuit within present angle register 115 controls the state of the sign bit. Each time an overflow condition occurs in main adder 120, the sign bit is alternately set from plus to minus. Therefore, when the overflow condition occurs, at the end of a second quadrant, the sign bit is set to a minus and will remain a minus for the second and third quadrants for all values of the sine function.

At the beginning of the third quadrant, another compensation is required from corrector adder 121. When the last address of the second quadrant (AP 1 through AP 9 all "ones"), is complemented it produces the zero angle address. Then, when the next advance signal clears the present angle register 115 to zero and disables complementer 112, the zero angle address occurs again. The compensator adder 121 adds one to prevent this repetition.

At the end of the third quadrant, detection of the next angle of 501 by means 123 again causes the corrector adder 121 to insert the required correction factor 23 and the quadrant bit on lead AP 10 causes complement addresses to be applied to matrix 108 for the fourth quadrant. Incrementing at the end of the fourth quadrant (plus the jump of one) restores initial conditions and the next cycle starts.

When the sine functions are required for a harmonic of $f_0$, the number of the harmonic is applied to register 117. Thus, the harmonic frequencies are produced by advancing the present angle by a number of increments corresponding to the harmonic required.

Cosine functions are produced by initially setting the signal on lead AP 10 (quadrant bit) to a "one" with a cosine reset signal on lead 101 to flip-flop 131. In effect, this produces a 90° shift of the sine function. The "one" on lead AP 10 is continually added to the input harmonic register. Thus, for the frequency $f_0$ an overflow condition occurs at the end of the first quadrant, causing the sign bit on lead 113 to be set for the cosine functions for the second and third quadrants. The output for the cosine function is identical to that previously described except that the first output will be the same as the second quadrant sine function. Since the initial addresses will be complemented, the present angle register must be advanced by 12 counts as described for the sine transition from the first to the second quadrant. This correction is applied by corrector adder 121 when a cosine reset signal is received by means 123.

4. Computer II a. Description

Figure 4:
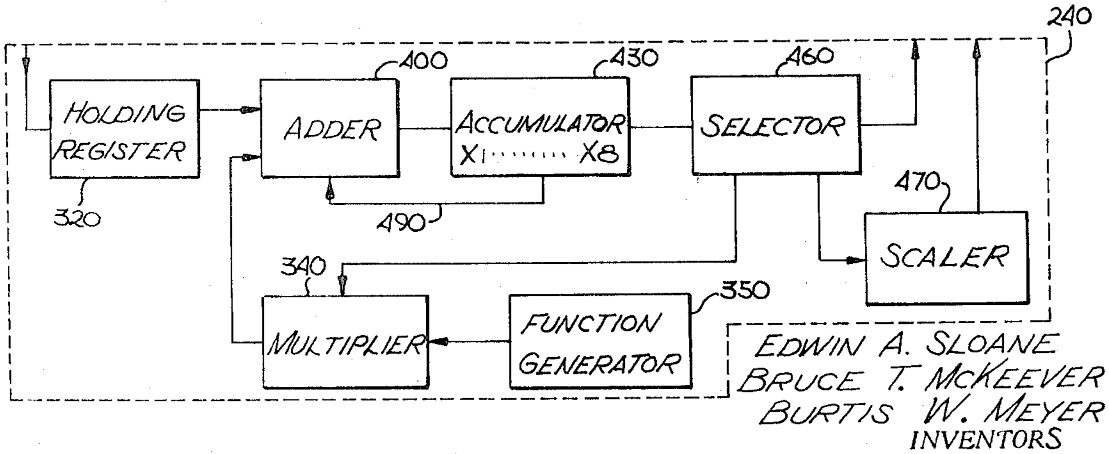
FIG. 4 illustrates an alternative embodiment for the processor of the computer.

A block diagram for the processor subsystem of Computer II is illustrated in FIG. 4. The processor means is enclosed within dotted line 240 of FIG. 4. This processor is directly replaceable with the processor subsystem enclosed within dotted line 24 of FIG. 5. Thus, the input subsystem 20 and memory subsystem 22 of Computer I may be utilized in Computer II. In replacing the processor subsystem of FIG. 4 with that of FIG. 5, holding register 320 of FIG. 4 is coupled to memory output line 31 of FIG. 5. Selector 460 and scaler 470 of FIG. 4 are coupled to memory input line 27 of FIG. 5.

Computer I is illustrated in FIG. 5 with a processor subsystem capable of performing simultaneous calculations on two channels of data (Channel A and Channel B). For Computer II, the illustrated processor subsystem of FIG. 4, contains means for processing only one channel of data.

Two channels of information may be processed simultaneously as in the case with Computer I, by duplicating the processor means shown in FIG. 4.

Referring to FIG. 4, holding register 320 may be similar to holding register 32 of FIG. 5. Holding register 320 is coupled to memory output line 31 of FIG. 5 and adder 400.

Adder 400 of Computer II is similar in construction to adder 40 of FIG. 5. Adder 400 is capable of adding or subtracting two digital words, the first of these words is received from accumulator 430 through lead 490 and the second is received from multiplier 340 or holding register 320. The sum or difference from adder 400 is transmitted to accumulator 430. Adder 400 is coupled to accumulator 430, multiplier 340 and holding register 320.

Accumulator 430 is similar in construction to accumulator 43 of FIG. 5 with one major exception, accumulator 430 contains sections number X1 through X8. As will be seen later, more than four accumulator sections are required in accumulator 430 in order to perform the double complex fold utilized in Computer II. Each section of accumulator 430 is capable of receiving data from adder 400. Accumulator 430 is coupled to adder 400 and selector 460.

Selector 460 is similar in construction to selector 46 of FIG. 5. Selector 460 is capable of coupling any of the eight sections in accumulator 430 with either memory input line 27 of FIG.

5, scaler 470, or multiplier 340. Selector 460 is coupled to accumulator 430, memory input line 27 of FIG. 5, scaler 470 and multiplier 340.

Scaler 470 is similar in construction to scaler 47 of FIG. 5. As in the case of Computer I, scaler 470 divides by a factor of 2. This division is accomplished after the first fold in Computer II. Scaler 470 is coupled to selector 460 and memory input line 27 of FIG. 5.

Function generator 350 is similar to function generator 35. It performs an identical function to function generator 35, producing the sine and cosine values of a fundamental frequency and certain harmonics of the fundamental frequency at angular increments corresponding in time to the sample period utilized on the input signal. Function generator 350 is coupled to multiplier 340.

Multiplier 340 is similar to multiplier 33 and 34 of FIG. 5. Multiplier 340 determines the product of the signals received from selector 460 and function generator 350. The output product of multiplier 340 is transmitted to adder 400. Multiplier 340 is coupled to function generator 350, selector 460 and adder 400.

As in the case of Computer I, control and instruction logic means 26 of FIG. 1 provides the timing control and instruction logic for the processor of Computer II. Means 26 is coupled to holding register 320, adder 400, accumulator 430, selector 460, scaler 470, function generator 350 and multiplier 340.

In the present description for Computer II, since only one processor is illustrated, memory storage is not necessary for two input signals. Thus, it is possible to use the space provided for the second input signal for storage of additional samples of a given input signal. As will be seen from the following description, the processor of Computer II allows maximum utilization of the memory therefore allowing memory means 29 to store 4,096 samples of an input signal. That is, sections A1, A2, B1 and B2 of memory 22 (FIG. 5) may be utilized for storing both the samples of the input signal and the inprocess data.

The the principles herein disclosed for obtaining the Fourier transform a variable input frame, the number of samples of the input signal may be utilized thus allowing the input signal to be sampled 128, 512, 1,024, 2,048, etc., times. Computer I and II may be utilized with any size input frame. Memory 22 may be made to accommodate large store space if a larger frame than is herein described is desirable.

b. Operation

The operation of Computer II proceeds in a similar manner to Computer I. Once again, the operation may be divided into a number of cycles.

Cycle 1—input data cycle;

Cycle 2—first fold;

Cycles 3, 4 and 5—single complex fold;

Cycles 6, 7 and 8—double complex fold;

Cycle 9—determination of the coefficients of the Fourier transform from $X_{p,q}$ and $Y_{p,q}$ of the last fold.

Cycle 1

Cycle 1 for Computer II proceeds in an identical manner as cycle 1 for Computer I. During cycle 1, the input signal is sampled and stored in memory 22. Note that in Computer I 1,001 samples were taken of the input signal. Since Computer II contains only one channel for processing data, 2,048 samples may be taken of the input signal and stored in sections A1 and B1 of memory 22. Thus, the number of samples of the input signal may be 128, 256, 512, 1,024 or 2,048 in Computer II. In some applications, the input signal may be in digital form and therefore not requiring an analog to digital conversion. In this situation, the digital data is stored in memory 22 in the same manner as are the output signal from the analog to digital converter.

Cycle 2

Cycle 2 corresponds to cycle 2 of Computer I. During cycle 2, the first fold is performed on the samples of the input signal and the terms $\Sigma_n$ and $\Delta_n$ are computed in accordance with equations 21 and 22 shown in section 2*b* of this application. Note that since only one adder, adder 400, is available in Computer II, the adder must form both the $\Sigma_n$ and $\Delta_n$ quantities. In general terms, the first fold proceeds as follows. A sample $g(t)$ of the input signal is transmitted to accumulator section X1. Next, the quantity corresponding to $g(T-t)$ is transmitted to adder 400. Simultaneously, the quantity corresponding to $g(t)$ is returned to adder 400 through lead 490 and the quantity $\Sigma_n$ is formed and stored in section X2 of accumulator 430. Following this, the quantity $\Delta_n$ is formed in the same manner as $\Sigma_n$ and stored in section X2 of accumulator 430. These two quantities are then returned to memory 22 via selector 460 and scaler 470 and stored in the same location as $g(t)$ and $g(T-t)$ had been previously stored. Note once again that after the first fold each of the resultant $\Sigma_n$ and $\Delta_n$ terms are divided by a factor of 2 in scaler 470. As pointed out in Computer I, the dividing of each of the terms in the first fold does not change the validity of the equations in section 2*b* of this application. After the entire samples of the input signals have been folded, the second cycle is completed.

Cycle 3

During cycle 3, the quantity $\Sigma(X_{p,q}(t))=X_{p,q}(t)+X_{p,q}(T_p-t)=X_{p+1,q}(t)$ and $\Delta(X_{p,q}(t))=X_{p,q}(t)-X_{p,q}(T_p-t)$ are formed where $T_p=\frac{1}{2}T2^{-p}$. (Hereafter for purposes of explanation, the $\Sigma$ and $\Delta$ notation as defined in the preceding two equations will be utilized herein.) Note for the first complex fold on the results of cycle 2, $T_p=\frac{1}{2}T$ and the term $\Sigma(X_{p,q}(t))$ is equivalent to equation 24 of section 2*b*. These quantities are computed in the same manner in which sum and difference quantities $\Sigma_n$ and $\Delta_n$ were computed in cycle 2. After completing the formation of these quantities, $\Delta(X_{p,q}(t))$ is stored in accumulator section X2. The quantity $\Sigma(X_{p,q}(t))$ is returned to memory 22 via selector 460 and stored. Note that the quantity $\Sigma(X_{p,q}(t))$ is equivalent to the quantity shown in equation 36 of section 2*b*.

Cycle 4

During cycle 4, the quantities $\Sigma(Y_{p,q}(t))$ and $\Delta(Y_{p,q}(t))$ are computed in the same manner as were the quantities $\Sigma(X_{p,q}(t))$ and $\Delta(X_{p,q}(t))$ during cycle 3. $\Delta(X_{p,q}(t))$ is then stored in memory 22. Note this quantity corresponds to the quantity shown in equation 37 of section 2*b*. Cycle 4 is completed when the quantity $\Delta(Y_{p,q}(t))$ is stored in memory 22 and $\Sigma(Y_{p,q}(t))$ is stored in accumulator section X4. As was the case in cycle 3, the first time cycle 4 is performed on the results of cycle 2, the $\Delta(Y_{p,q}(t))$ quantity is that shown in equation 25 of section 2*b*.

Cycle 5

During cycle 5, the quantities corresponding to $$X_{p+1,q+2^p}(t)=\Delta[X_{p,q}(t)]\cos\omega_p t+\Sigma[(Y_{p,q}(t)]\sin\omega_p t$$

$$Y_{p+1,q+2^p}(t)=\Sigma[Y_{p,q}(t)]\cos\omega_p t-\Delta[X_{p,q}(t)]\sin\omega_p t$$

Where $\omega_p=2^p\omega_0$ are computed.

At the beginning of cycle 5, the quantity corresponding to $\Delta(X_{p,q}(t))$ is removed from accumulator section X2 and transmitted to multiplier 340 via selector 460. Simultaneously, function generator 350 generates the appropriate value for $\cos\omega_p(t)$. The product of these two quantities is then formed and transmitted to accumulator section X3 via adder 490. Next, the quantity corresponding to $\Sigma(Y_{p,q}(t))$ is removed from accumulator section X4 and transmitted to multiplier 340 via selector 460. Simultaneously, function generator 350 generates the function corresponding to $\sin\omega_p(t)$. The product of these two quantities is then transmitted to adder 400. Next, the quantity corresponding to $\Delta(X_{p,q}(t))\cos\omega_0(t)$ is returned to adder 400 and the quantity corresponding to that shown in equation 38 of section 2*b* is computed. This quantity is then transmitted via accumulator 430, selector 460 to memory 22. Following this, the quantity $\Sigma(Y_{p,q}(t))$ is removed from accumulator section X4 and transmitted to multiplier 340. Simultaneously, function generator 350 generates the function $\cos\omega_p(t)$ and it is transmitted to multiplier 340. The product of these two quantities is computed in multiplier 340 and returned to accumulator section X1. Next, the quantity $\Delta(X_{p,q}(t))$ is transmitted from accumulator section X2 to multiplier 340 and multiplied with $\sin\omega_p(t)$ generated by function generator 350. This product is then transmitted to adder 400 where it is subtracted from the quantity $\Sigma(Y_{p,q}(t))\cos\omega_p(t)$ previously stored in accumulator section X1. This quantity which is equivalent to that shown in equation 39 of section 2*b*, is then stored in memory 22. Cycles 3, 4 and 5 are repeated for each of the $X_{p,q}$ and $Y_{p,q}$ for any given *p*. Thus, by use of cycles 3, 4 and 5, $X_{p,q}$ and $Y_{p,q}$ at stage *p* may be converted to stage *p*+1 utilizing a complex fold.

Cycle 6

During cycle 6, the quantity corresponding to $\Sigma\Sigma(X_{p,q}(t))=X_{p,q}(t)+X_{p,q}(T_p-t)+X_{p,q}(\frac{1}{2}T_p-t)+X_{p,q}(\frac{1}{2}T_p+t)$ $\Delta\Sigma(X_{p,q}(t))=X_{p,q}(t)+X_{p,q}(T_p-t)-X_{p,q}(\frac{1}{2}T_p-t)-X_{p,q}(\frac{1}{2}T_p+t)$ $\Delta(X_{p,q}(t))=X_{p,q}(t)-X_{p,q}(T_p-t)$ $\Delta(X_{p,q}(\frac{1}{2}T_p-t))=X_{p,q}(\frac{1}{2}T_p-t)-X_{p,q}(\frac{1}{2}T_p+t)$ Where $T_p=\frac{1}{2}T2^{-p}$ are computed. These quantities are computed in a similar manner as was utilized in cycle 3.

At the beginning of cycle 6 the term corresponding to $X_{p,q}(t)$ is transmitted to accumulator section X1. The term $X_{p,q}(t)$ is returned to adder 400 via lead 490. Next, the term $X_{p,q}(T_p-t)$ is brought from memory 22 to adder 400 and the sum $X_{p,q}(t)+X_{p,q}(T_p-t)$ is computed and stored in section X3. In the same manner the difference $X_{p,q}(t)-X_{p,q}(T_p-t)$ is computed and stored in section X4. Following this, the term $X_{p,q}(\frac{1}{2}T_p-t)$ is transmitted to accumulator section X1 and the term $X_{p,q}(\frac{1}{2}T_p+t)$ is brought from memory 22 to adder 400. The sum and difference of these terms are calculated and stored in sections X5 and X6, respectively. The quantity in section X3 is added to the quantity in X5 and the sum $\Sigma\Sigma(X_{p,q}(t))$ is stored in memory 22. This sum is equivalent to the term $X_{p+2,q}(t)$ shown in equation 46 of section 2*b*.

Next, the quantity in accumulator section X5 is subtracted from the quantity in section X3 forming $\Delta\Sigma(X_{p,q}(t))$ and returned to section X2. Thus, at the end of cycle 6 accumulator 430 contains the following quantities:

Section X2 . . . $\Delta\Sigma(X_{p,q}(t))$

Section X4 . . . $\Delta(X_{p,q}(t))$

Section X6 . . . $\Delta(X_{p,q}(\frac{1}{2}T-t))$

Cycle 7

During cycle 7, the quantities $\Delta\Delta(Y_{p,q}(t)=Y_{p,q}(t)-Y_{p,q}(T_p-t)-Y_{p,q}(\frac{1}{2}T_p-t)+Y_{p,q}(\frac{1}{2}T_p+t)$ $\Sigma\Delta(Y_{p,q}(t))=Y_{p,q}(t)-Y_{p,q}(T_p-t)+Y_{p,q}(\frac{1}{2}T_p-t)-Y_{p,q}(\frac{1}{2}T_p+t)$ $\Sigma(Y_{p,q}(t))=Y_{p,q}(t)+Y_{p,q}(T_p-t)$ $\Sigma(Y_{p,q}(\frac{1}{2}T_p-t))=Y_{p,q}(\frac{1}{2}T_p-t)+Y_{p,q}(\frac{1}{2}T_p+t)$ are computed.

These quantities are computed in a similar manner to those in cycle 6. $\Delta\Delta(Y_{p,q}(t))$ is stored in memory 22, this term corresponds to cycle 6 $Y_{p+2,q}(t)$ shown in equation 47 of section 2*b*. At the end of cycle 7 the following terms are stored in accumulator 430.

Section X1 . . . $\Sigma\Delta(Y_{p,q}(t))$

Section X3 . . . $\Sigma(Y_{p,q}(t))$

Section X5 . . . $\Sigma(Y_{p,q}(\frac{1}{2}T_p-t))$

Cycle 8

During cycle 8, the quantities shown in equations 46 through 53 are calculated in a similar manner to the method used in cycle 5. When these quantities have each been computed, they are then stored in the appropriate sections of memory 22. Upon completion of cycle 8, a double fold is completed. If an additional double fold is required, cycles 6, 7 and 8 are repeated.

By way of example, the following operations would occur in the computation of the quantity $X_{p+2,q+2.2}p(t)$ (equation 48). The term $(X_{p,q}(\frac{1}{2}T_p-t)=X_{p+1,q}(t)-X_{p+1,q}(\frac{1}{2}T2^{-p+1}-t)$ previously stored in section X2 of accumulator 430 is transmitted to multiplier 340. Simultaneously, function generator 350 generates the word corresponding to $\cos{}^{p+1}\omega_0 t$. The product $(X_{p,q}(t))\cos{}^{p+1}\omega_0 t$ is stored in section X7. In a similar manner, the quantity $\Delta(Y_{p,q}(t))\sin 2^{p+1}\omega_0 t$ is computed and transmitted to adder 400. Next, the quantity previously stored in section X7 is returned to adder 400 and summed with $\Delta(Y_{p,q}(t))\sin 2^{p+1}\omega_0 t$ forming the $X_{p+2}2p+1$ (equation 48). This quantity is then stored in memory 22. By a similar manner, the other quantities represented by equation 46 through 53 may be computed.

Cycles 6, 7 and 8 are repeated for each of the $X_{p,q}$ and $Y_{p,q}$ for any given *p*. Thus, by use of cycles 6, 7 and 8, $X_{p,q}$ and $Y_{p,q}$ at stage *p* are converted to stage (*p*+2) utilizing a double complex fold. Note that the number of memory accesses has been reduced approximately in half by performing cycles 6, 7 and 8 when compared to the number of memory accesses required to perform cycles 3, 4 and 5 twice.

Note that it is possible to perform cycle 6, 7 and 8 after cycle 2, thereby performing a double complex fold after the first fold. Note also that cycles 3, 4, 5 and 6, 7 and 8 may be used interchangeably as previously discussed in section 2*a*.

After the data has been converted to groups of three X terms and one Y term ($p = \log_2 N/4$), the folding process is completed and cycle 9 begins.

Cycle 9

During cycle 9, the coefficients of the Fourier transform are computed from the groups of two words. This computation is performed utilizing the equations shown on pages 29 and 30 of section 2*b*. This computation is the solution of simple simultaneous equations and any one of numerous commonly known techniques may be utilized to solve these simultaneous equations. After the computation of cycle 9, the coefficients are stored in sections A3 and B3 of memory 22 and the transform is completed.

Thus, by utilizing cycles 1 through 9, the coefficients of a Fourier transform for an input signal may be determined utilizing Computer II. As has been previously noted, considerable savings in processing time is achieved by utilizing the above-described described folding techniques in the computation of the Fourier transform.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A method for computing the Fourier transform of a real signal, where the said signal is represented by *N* number of amplitude sample, ($A_n$) of said signal, in a computer comprising a memory means, arithmetic means, trigonometric means and accumulation means comprising the following steps:

a. performing a first fold of said amplitude samples to form the quantities $(A_n+A_{N-n})=\Sigma_n$ and $(A_n-A_{N-n})=\Delta_n$ with said arithmetic means;

b. performing a second fold on said quantities $\Sigma_n$ and $\Delta_n$ to form the quantities: $(\Sigma_n+\Sigma_{N-n})$, $(\Sigma_n-\Sigma_{N-n})$, $(\Delta_n+\Delta_{N-n})$ and $(\Delta_n-\Delta_{N-n})$ with said arithmetic means;

c. multiplying with said arithmetic means the results of said second fold by trigonometric functions generated by said trigonometric means;

d. adding and subtracting the results of each of said multiplications with the accumulated results of the prior multiplication for each frequency generated by said trigonometric means with said accumulation means;

whereby the results of said method will be the even frequency coefficients of a Fourier transform of said signal.

2. The method defined by claim 1 wherein said trigonometric functions include a trigonometric function of a fundamental frequency and harmonics of said fundamental frequency.

3. The method defined by claim 2 wherein said amplitude samples ($A_n$) of said signal are taken at substantially equally spaced time intervals.

4. The method defined by claim 3 wherein the period of said fundamental frequency is approximately equal to the time interval between the first and last amplitude samples.

5. The method defined in claim 1 wherein the results of the first fold are multiplied by trigonometric functions generated by said trigonometric means with said arithmetic means, and the results of said multiplication are accumulated for each frequency generated by said trigonometric means with said accumulation means to yield the odd frequency coefficients of a Fourier transform of said signal.

6. A method for computing the Fourier transform of a real signal, where the said signal is represented by $N$ number of amplitude samples, $(A_n)$ of said signal, in a computer comprising a memory means, arithmetic means, trigonometric means and accumulation means comprising the following steps:

a. performing a first fold of said amplitude samples to form the quantities $(A_n+A_{N-n})=\Sigma_n$ and $(A_n-A_{N-n})=\Delta_n$ with said arithmetic means;

b. folding the quantities $\Sigma_n$ and $\Delta_n$ and the results thereof in a complex fold forming the quantities $X_{p,q}$ and $Y_{p,q}$ until $p = \log_2 N/2$ with said arithmetic means trigonometric means and accumulation means;

c. solving the equations $$X_{p,q}=2^p \sum_{0}^{1/2N_2-P} [a_2P_{k+q}-a_2p_{k-q} + b_2P_{k+q}-b_2p_{k-q}] \cos 2^p k\omega_0 t$$

$$Y_{p,q}=2^k \sum_{0}^{1/2N_2-k} [a_2P_{k+q}-a_2P_{k-q} + b_2k_{k+q}+b_2k_{k-q}] \sin 2^P k\omega_0 t$$

for each said value of $a$ and $b$ where said sine and cosine values are generated by said trigonometric means and said accumulation means accumulates the terms of said equations;

whereby the values of $a$ and $b$ will be representative of the real and imaginary coefficients of the Fourier transform of said signal.

7. The method defined by claim 6 wherein said quantities $\Sigma_n$ and $\Delta_n$ are folded in a complex fold to form the quantities $X_{p,q}$ and $Y_{p,q}$ where $p = \log_2 N/2$ includes at least one double complex fold where the quantities $X_{p,q}$ and $Y_{p,q}$ are converted to the $X_{p+2,q}$ and $Y_{p+2,q}$ stage without computing the quantities $X_{p+1,q}$ and $Y_{p+1,q}$.

8. The method defined by claim 7 wherein said amplitude samples $(A_n)$ of said signal are taken at substantially equally spaced time intervals.

9. A method for computing the Fourier transform of a real signal, where said signal is represented by $N$ number of amplitude samples, $(A_n)$ of said signal, in a computer comprising an arithmetic means, trigonometric means and accumulation means comprising the following steps:

a. performing a first fold of said amplitude samples to form the quantities $(A_n+A_{N-n})=\Sigma_n$ and $(A_n-A_{N-n})=\Delta_n$ with said arithmetic means;

b. multiplying with said arithmetic means the results of said first fold by trigonometric functions generated by said trigonometric means;

c. accumulating the results of each of said multiplications with the accumulated results of the prior multiplications for each frequency generated by said trigonometric means with said accumulation means;

whereby the results of said method will be the coefficients of a Fourier transform of said signal.

10. The method defined by claim 9 wherein said trigonometric functions include a trigonometric function of a fundamental frequency and harmonics of said fundamental frequency.

11. The method defined in claim 10 wherein said amplitude samples $(A_n)$ of said signal are taken at substantially equally spaced time intervals.

12. A method for computing the Fourier transform of a real signal, where the said signal is represented by $N$ number of amplitude samples, $(A_n)$ of said signal, in a computer comprising a memory means, arithmetic means, trigonometric means and accumulation means comprising the following steps:

a. performing a first fold of said amplitude samples to form the quantities $(A_n+A_{N-n})=\Sigma_n$ and $(A_n-A_{N-n})=\Delta_n$ with said arithmetic means;

b. folding the quantities $\Sigma_n$ and $\Delta_n$ in complex folds forming the quantities $X_{p,q}$ and $Y_{p,q}$ until $p = \log_2 N/4$ with said arithmetic means, trigonometric means and accumulation means;

c. solving the eight resulting simultaneous equations equal to $2Na_q$; $2Nb_q$; $2Na_{(N/2)-q}$; $2Nb_{(N/2)-q}$; $2Na_{(N/4)-q}$; $2Nb_{(N/4)-q}$; $2Na_{(N/4)+q}$ and $2Nb_{(N/4)+q}$ for each of said values of $a$ and $b$ where said sine and cosine values are generated by said trigonometric means and said accumulation means accumulates the terms of said equations;

whereby the values of $a$ and $b$ will be representative of the real and imaginary coefficients of the Fourier transform of said real signal.

13. The method defined by claim 12 wherein the folding of the quantities $\Sigma_n$ and $\Delta_n$ to form the eight simultaneous equations includes at least one double complex fold where the quantities $X_{p,q}$ and $Y_{p,q}$ are converted to the $X_{p+2,q}$ and $Y_{p+2,q}$ stage without computing the quantities $X_{p+1,q}$ and $Y_{p+1,q}$.

* * * * *